United States Patent [19]

Slawy et al.

[11] Patent Number: 4,494,231

[45] Date of Patent: Jan. 15, 1985

[54] TIME DIVISION SWITCHING SYSTEM FOR CIRCUIT MODE AND PACKET MODE CHANNELS

[76] Inventors: Serge Slawy, Kergavant; Olivier F. Louvet, 22, av. de Normandie Keruhel; Jean L. Dauphin, 70, Residence Corlay, all of Lannion, France, 22300

[21] Appl. No.: 339,880

[22] Filed: Jan. 15, 1982

[30] Foreign Application Priority Data

Jan. 23, 1981 [FR] France ............................. 81 01327

[51] Int. Cl.³ .............................................. H04J 6/00
[52] U.S. Cl. .................................................. 370/60
[58] Field of Search ..................... 370/60, 91, 92, 94, 370/79, 84

[56] References Cited

U.S. PATENT DOCUMENTS 3,890,469 6/1975 Kelly et al. .......................... 370/60
4,058,672 11/1977 Crager et al. ......................... 370/60

OTHER PUBLICATIONS

J. deSmet et al., "Pacuit Switching Combines Two Techniques in One Network", Computer Design, vol. 15, No. 6, Jun. 1976, pp. 83–88.

Y. Ikeda et al., "Virtual Circuit Switching System: A New System Concept for Telephony and Data Integration", ISS, May 1976, pp. 757–764.

M. Ross et al., "An Architecture for a Flexible Voice/Data Switch", ICC, Jun. 1980, pp. 21.6.1–21.6.5.

Primary Examiner—Douglas W. Olms
Assistant Examiner—Wellington Chin
Attorney, Agent, or Firm—Lowe, King, Price & Becker

[57] ABSTRACT

The switching network included in the system is connected to circuit mode and/or packet mode mono- or multi-channel digital lines via connection modules. These modules enable the system connections to be standardized and accept thus any number of multiplexed channels in the lines and any transmission mode, namely duplex or half-duplex. The flag/packet transition in a packet mode channel is detected in a connection module and is transmitted as a particular word in a predetermined time interval of the outgoing multiplex of this module, at the same time as the address of the channel, thereby precluding the use of purpose-built links.

17 Claims, 15 Drawing Figures

| FRAME NR. | LINK CHANNEL 40 NR. | COMMENTS | TO SWITCHING NETWORK (MUX0) | | | | | | TO SWITCHING NETWORK (MUX1) | | | | | | FRAME NR. | LINK CHANNEL 40 NR. |
|---|---|---|---|---|---|---|---|---|---|---|---|---|---|---|---|---|
| | | | WI in T1o | | | | | | WI in T1o | | | | | | | |
| 0 | | multiframe alignment | 0 | 0 | 0 | 1 | 1 | 1 | 0 | 0 | 0 | 1 | 1 | 1 | 0 | |
| 1 | 1 | SL packet mode | 1 | 1 | $A_0$ | $A_1$ | $A_2$ | $A_3$ $A_4$ | 1 | 1 | $P_0$ | $P_1$ | $P_2$ | $P_3$ $P_4$ | 1 | 1 |
| --- | --- | | | | | | | | | | | | | | --- | --- |
| 5 | 5 | flag/packet transition | 0 | 1 | 0 | 0 | 1 | 0 1 | | | | | | | 5 | 5 |
| 6 | 6 | SL packet mode | 1 | 1 | $A_0$ | $A_1$ | $A_2$ | $A_3$ $A_4$ | 1 | 1 | $P_0$ | $P_1$ | $P_2$ | $P_3$ $P_4$ | 6 | 6 |
| 7 | 7 | SL circuit mode | 0 | 0 | $A_0$ | $A_1$ | $A_2$ | $A_3$ $A_4$ | 0 | 1 | $P_0$ | $P_1$ | $P_2$ | $P_3$ $P_4$ | 7 | 7 |
| 8 | 8 | SL circuit mode | 0 | 0 | $A_0$ | $A_1$ | $A_2$ | $A_3$ $A_4$ | 0 | 1 | $P_0$ | $P_1$ | $P_2$ | $P_3$ $P_4$ | 8 | 8 |
| 9 | 9 | flag/packet transition | 0 | 1 | 0 | 0 | 1 | | 0 | 0 | | | | | 9 | 9 |
| --- | --- | | | | | | | | | | | | | | --- | --- |
| 23 | 23 | CL | 0 | 1 | $A_0$ | $A_1$ | $A_2$ | $A_3$ $A_4$ | 0 | 1 | $P_0$ | $P_1$ | $P_2$ | $P_3$ $P_4$ | 23 | 23 |
| 24 | 24 | PL | 1 | 0 | $A_0$ | $A_1$ | $A_2$ | $A_3$ $A_4$ | 1 | 0 | $P_0$ | $P_1$ | $P_2$ | $P_3$ $P_4$ | 24 | 24 |
| --- | --- | | | | | | | | | | | | | | --- | --- |
| 27 | 27 | PSUL | 1 | 0 | $A_0$ | $A_1$ | $A_2$ | $A_3$ $A_4$ | 0 | 1 | $P_0$ | $P_1$ | $P_2$ | $P_3$ $P_4$ | 27 | 27 |
| 28 | 28 | PSUL | 1 | 0 | $A_0$ | $A_1$ | $A_2$ | $A_3$ $A_4$ | 1 | 0 | $P_0$ | $P_1$ | $P_2$ | $P_3$ $P_4$ | 28 | 28 |
| --- | --- | | | | | | | | | | | | | | --- | --- |
| 30 | 30 | unconnected | 0 | 0 | 0 | 0 | 0 | 0 | 0 | 0 | 1 | 1 | 1 | 1 | 30 | 30 |
| 31 | 31 | unconnected | 0 | 0 | 0 | 0 | 0 | 0 | 0 | 0 | 1 | 1 | 1 | 1 | | |

MULTIFRAME: INFORMATIONS IN T1o

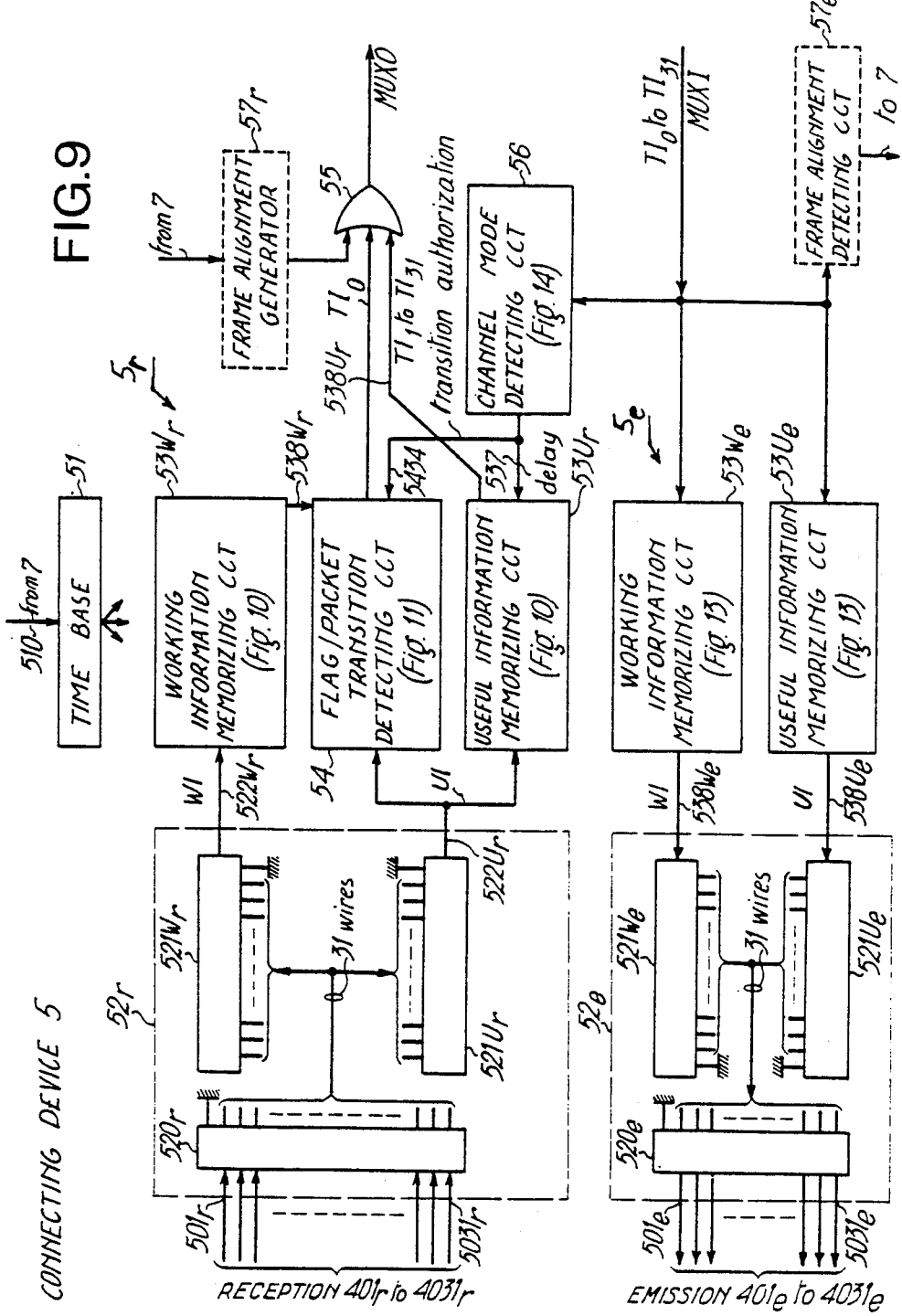

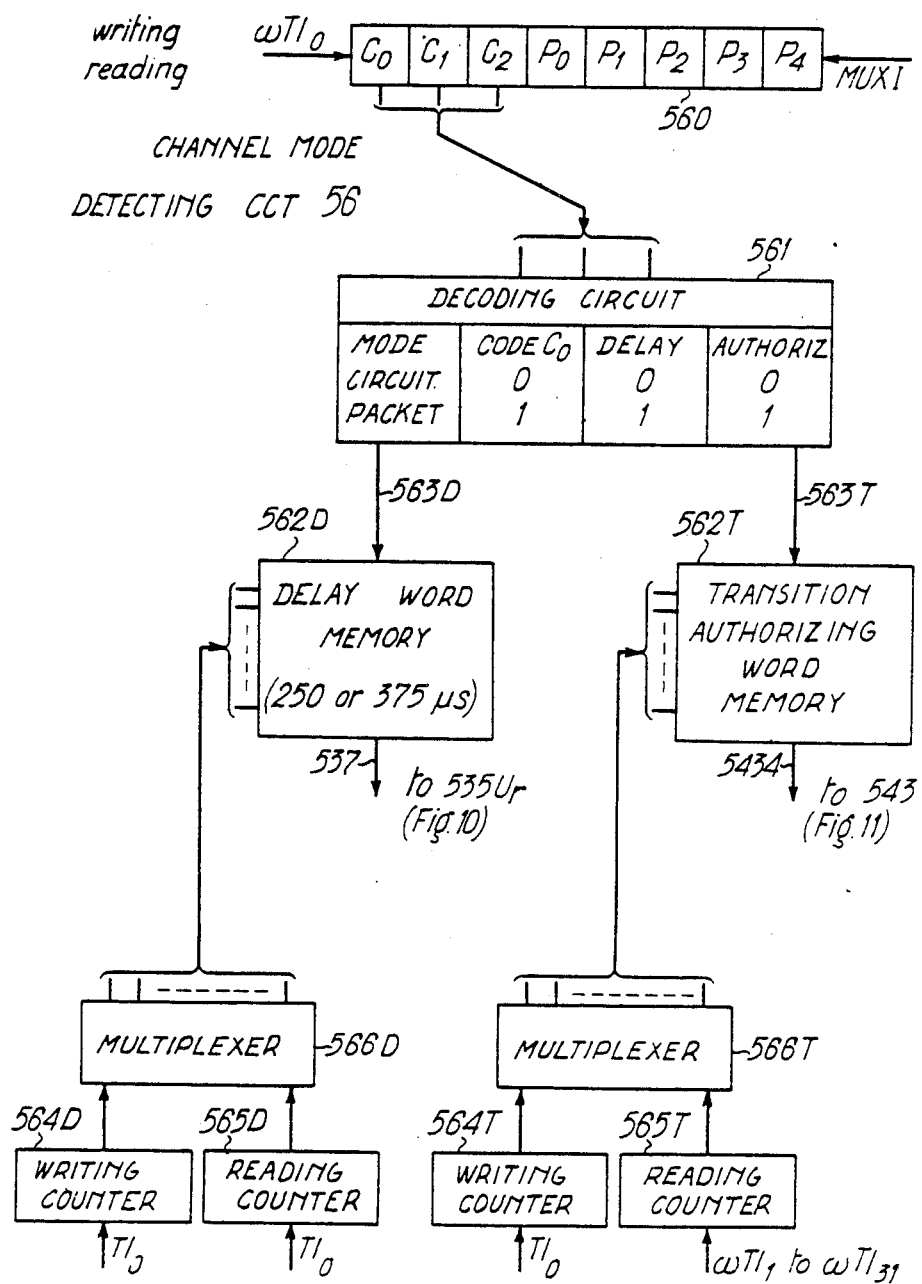

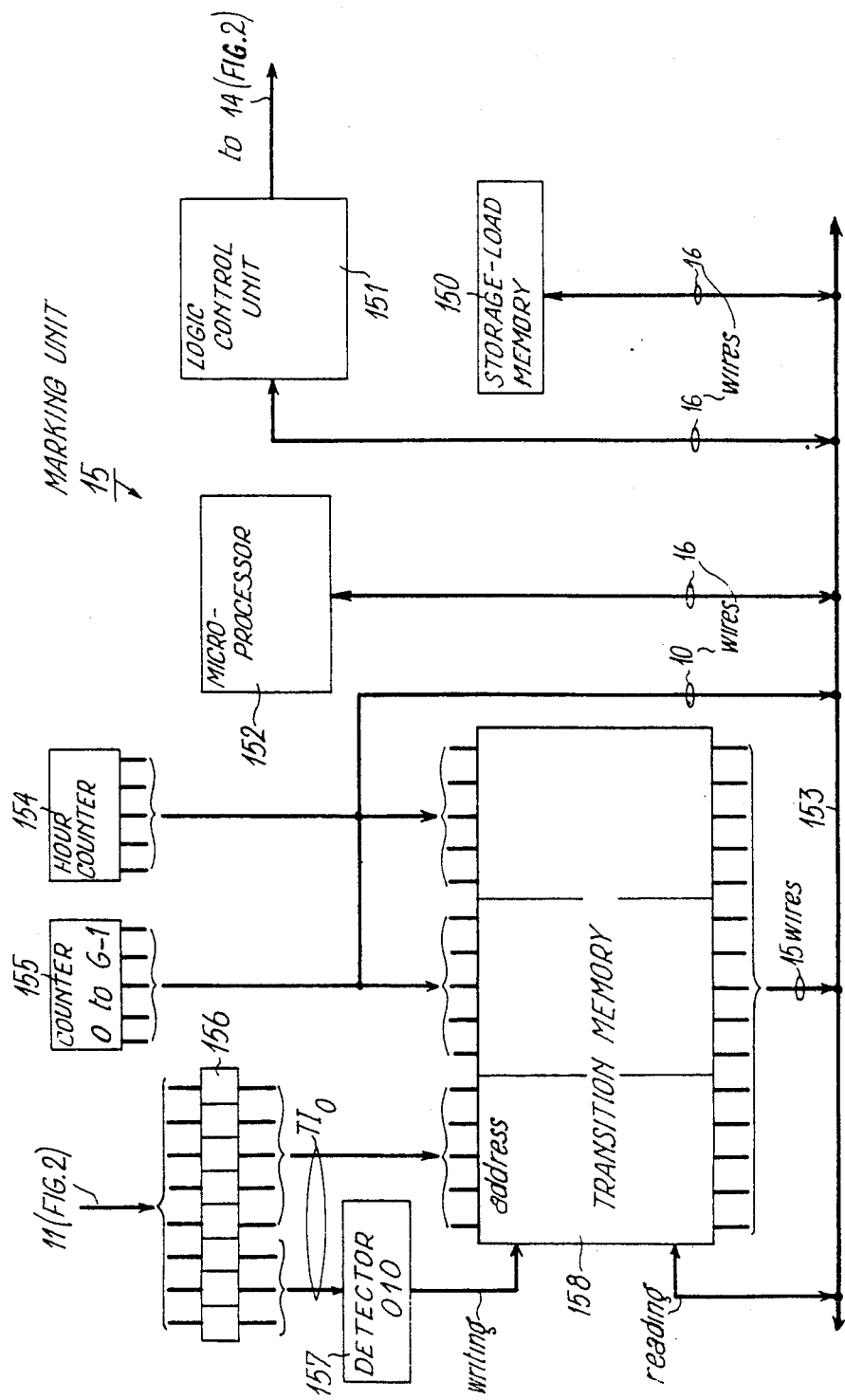

TIME DIVISION SWITCHING SYSTEM FOR CIRCUIT MODE AND PACKET MODE CHANNELS

BACKGROUND OF THE INVENTION

1. Field of the invention

This invention relates to a time division digital switching system for circuit mode and packet mode channels having a predetermined bit-rate. The channels convey useful information words having a predetermined number of bits, such as data words or voice sample words.

More particularly, the system comprises G first multiplexing means each of which multiplexes a group of I reception channels into an outgoing multiplexed signal, G first demultiplexing means, each of which demultiplexes an incoming multiplexed signal into a group of I emission channels wherein each multiplexed signal has a recurrent frame comprising I useful information words assigned to the multiplexed channels, and means for bidirectionally switching the circuit mode channels and the packet mode channels between the incoming and outgoing multiplexed signals.

2. Description of the Prior Art

Such a system, also referred to as a multiservice switching system, is described in European patent application No. 34,514 (which corresponds to the U.S. patent application Ser. No. 231,936, filed Feb. 4, 1981). The reception channels are delivered by subscriber lines having a circuit mode channel for voice and a packet mode channel for data and by circuit mode or packet mode monochannel lines via individual equipments.

An individual equipment of a subscriber line comprises second multiplexing means for demultiplexing the channels. An individual equipment for a subscriber line or a monochannel packet mode line comprises a detector which detects flag/packet transitions in the packet mode channel. This detector transmits the address of the channel to the marking unit in the switching network or means of the multiservice system responsive to the detection of such a transition, via a specialized link. Likewise, when the packet switching unit associated with the multiservice system has a packet to transmit, it sends the address of the free packet mode monochannel line selected to the marking unit, again via a specialized link.

Organizing the system in such a fashion requires, on the one hand, that the individual equipments be in the vicinity of the switching network and, on the other hand, wiring that is both laborious and far from accessible from inside the switching network via specialized links when new packet mode individual equipment is connected.

Furthermore, the foregoing multiservice system does not allow subscriber lines having more than two multiplexed channels to be connected. Such lines are already known for example in French patent application No. 2,412,994 which deals with a multiservice system based on a packet mode switching network which is separated from a circuit mode switching network. The demand for lines permitting the simultaneous transmission of several voice channels and several packet channels is ever present with the growing needs of telematic subscribers.

OBJECTS OF THE INVENTION

This invention has two main objects.

The first main object is to transmit flag/packet transition indications directly onto the outgoing and incoming multiplexed signals which are coupled to the switching network to the multiservice system in order to avoid introducing specialized links.

The second main object is to standardize a channel level interface, once the channels have been demultiplexed from lines, so that any data transmission terminal may be connected to the first multiplexing and demultiplexing means, whether for a line in the duplex mode or the semi-duplex mode and/or monochannel or multichannel.

SUMMARY OF THE INVENTION

With this in mind, a time division digital switching system is characterized in that each of said first multiplexing means comprises:

means for introducing into predetermined time intervals (each included in one of I consecutive frames of said outgoing multiplexed signal defining a multiframe) working information words having a predetermined number of bits respectively assigned to said I reception channels, said incoming multiplexed signals also conveying said frames and multiframes, and means for detecting flag/packet transitions in said packet mode reception channels to replace the working information word by a flag/packet transition indicating word in a frame of said outgoing multiplexed packet mode reception channel in which a flag/packet transition has been detected, said switching means comprising means for receiving the working information words multiplexed in the multiframes of said outgoing multiplexed signal for detecting the transition indicating words to switch the channel with detected transition over to a free packet mode channel in an incoming multiplexed signal.

Since a time interval in each frame of the incoming and outgoing multiplexed signals is assigned to a working information word of a channel, the switching network can receive a flag/packet transition indicating word and the address of the packet mode channel, and a word which indicates the circuit- or packet-mode type of the channel, without going through specialized links. The dynamic allocation of the channels handled in the subscriber equipment installed on the premises of each subscriber and the off-setting of the first multiplexing and demultiplexing means at some distance from the switching network are then made possible.

This distance off-set proves necessary when, for example, several telematic subscribers are grouped together in the same place. In this case, the first multiplexing and demultiplexing means in each group comprises means for introducing an alignment word into each frame of the outgoing multiplexed signal and means for detecting an alignment word in each frame of incoming multiplexed signal so as to locally synchronize the time base associated with the first multiplexing and demultiplexing means with the time base associated with the switching means or network. Each frame of the incoming and outgoing multiplexed signals thus comprises an alignment word, a working information word and I useful information words.

To make the dynamic allocation of the channels possible, the invention provides, in each line channel, the possibility of conveying in addition to a useful information word, such as one or two packetized octets, a channel address word and at least one working information word bit. This working information indicates, not only the mode and emission source of the channel, such as a subscriber equipment, an outside network matching interface or a packet switching unit, but also alarm signals which are produced by a subscriber equipment or positioning signals which are intended for the subscriber equipment in the event of a failure detected by the switching network.

The working information in a line constitutes a secondary channel with a low bit-rate, typically 4 kbit/s for a useful information bit-rate of 64 kbit/s. The second multiplexing and demultiplexing means interconnected between the line and the interface of the channels, serving as transmission terminal equipment, enables the instantaneous bit-rate needs of the peripheral terminals in a subscriber equipment to be suitably adapted to the degree of activity of the peripheral equipments, whether this be for transmitting data or voice samples. According to one feature of this invention, the second multiplexing and demultiplexing means comprises for each line, at the reception end:

means for detecting the channel address words, means for demultiplexing the useful information words and the working information bits at the respective bit-rates thereof for each channel and means for multiplexing the useful information and the working information into a reception channel for said line in which the useful and working information words are multiplexed bit by bit; and reciprocally at the transmission end:

means for demultiplexing each emission channel of said line into the useful information words and the working information bits at the respective bit-rates thereof, means for multiplexing the useful information words and the working information bits at the respective bit-rates thereof for all the channels into the line channels, and means for inserting the address words in the multiplexed channel at the output of the latter multiplexing means.

The first multiplexing and demultiplexing means are standard for each group and the channel interfaces thereof on the line side are standardized. Depending on the type of duplex or half-duplex transmission or on the channel number in a line, a terminal equipment is plugged into the overall connection module which is related to a group of I channels. The terminal equipments are pluggable and interchangeable within this module, thereby easing any modification in the type of line to suit subscriber requirements.

BRIEF DESCRIPTION OF THE DRAWING

Other features and advantages of the invention will be apparent from the following more particular description of preferred embodiments of the invention as illustrated in the accompanying drawings, in which:

FIG. 7 is a summary table of the various working information words;

FIG. 8 is a table of the configuration of the outgoing and incoming multiplexed multiframes related to a switching network near and remote from connection modules;

FIG. 9 is a standardized connection device in a connection module, termed hereinabove as first multiplexing and demultiplexing means;

FIG. 14 is a block diagram of the channel mode detecting circuit in the emitting part of a connecting device; and FIG. 15 is a schematic block diagram of a part of the marking unit which is associated with the switching network of the multiservice system in accordance with the invention, and which is concerned with the packet mode channel switching.

DESCRIPTION OF THE PREFERRED EMBODIMENTS

Figure 1:
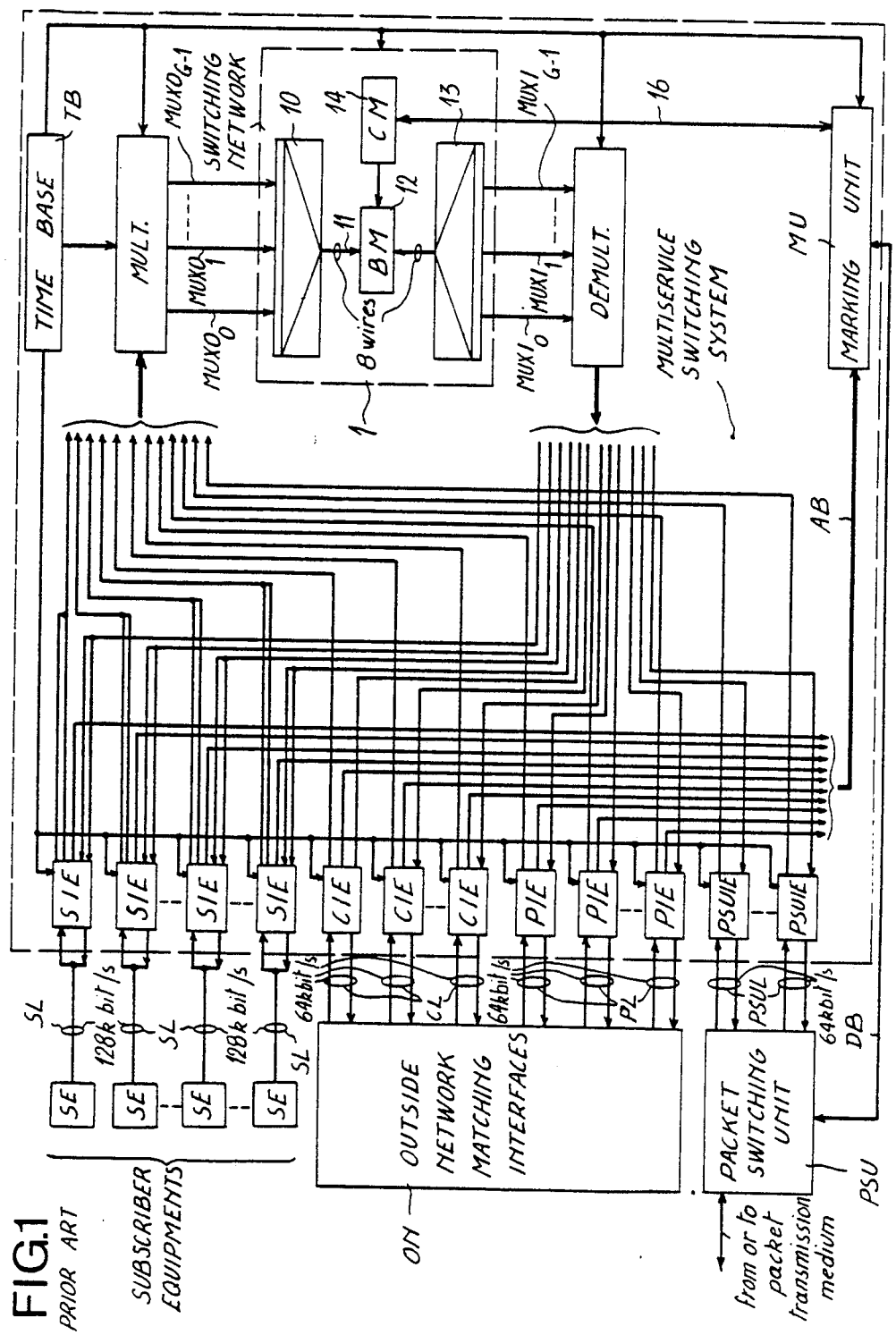
FIG. 1 is a schematic block diagram of the multiservice digital switching system in accordance with European patent application No. 34,514.

In FIG. 1 is shown schematically the multiservice time division digital switching system with its environment as disclosed in European patent application No. 34,514 (or U.S. patent application Ser. No. 231,936 filed Feb. 4, 1981).

This system simultaneously affords each telematic subscriber a plurality of services. These are selected through terminals which are placed in the subscriber equipment SE installed on the premises of the subscriber. These terminals can, besides a digital telephone set, be a teleprinter and/or keyboard display console, a telecopier or a visiophone. Each subscriber equipment SE is served by a bidirectional four-wire subscriber line SL which has an overall bit-rate of 128 kbit/s and which conveys two 64 kbit/s multiplexed channels. Each channel has constant time slots assigned to an octet. The first channel is in the circuit mode and transmits the 8-bit samples in PCM code for the voice exchange with the telephone set. The second channel is in the packet mode and transfers data packets at 64 kbit/s submultiple bit-rates, e.g. 300, 1200 and 9600 bit/s that are statistically multiplexed. The useful information in the channels is bidirectionally switched in the switching network 1 of the multiservice system in terms of their destination. As regards circuit mode voice or information, the useful information transmitted by the first channel of a subscriber line SL is retransmitted either in the first channel of a local subscriber line SL or along one of the 64 kbit/s circuit mode digital lines CL which are connected to the digital or analog outside telephone network. For packet mode data, the useful information in a second channel of a subscriber line SL is retransmitted via a free 64 kbit/s packet mode digital line PSUL towards a packet switching unit or exchange PSU. The packet switching unit PSU orientates the packets received thereby either directly towards the packet transmission medium associated with it or via a free line PSUL and switching network 1 towards the second channel of a subscriber line SL or toward a 64 kbit/s packet mode digital line PL that is connected to an outside transmission network, such as the telex. In FIG. 1, ON designates interfaces that match circuit mode and packet mode transmissions along the CL and PL lines respectively with the telephone and packet outside networks.

In the aforementioned patent application, each digital line SL, CL, PL, PSUL is connected to switching network 1 via an item of individual equipment SIE, CIE, PIE, PSUIE and a multiplexer-demultiplexer MULT-DEMULT. A subscriber individual equipment SIE demultiplexes the two channels outgoing from the respective subscriber equipment SE. The multiplexer MULT multiplexes the 64 kbit/s channels and 64 kbit/s lines outgoing from the individual equipments into digital channels MUXO having a higher bit-rate. The multiplexer MULT multiplexes, for example, G groups which each comprises 32 64 kbit/s channels, into G 2048 kbit/s parallel channels $MUXO_0$ to $MUXO_{G-1}$. Then in switching network 1, an input multiplexer 10 performs a multiplexing operation and a serial-to-parallel conversion so as to transmit the 8 parallel bits in each octet along an incoming supermultiplex line 11 which presents $G \times 32$ octets per recurrent frame having a length equal to 125 µs. After bidirectional switching in a buffer memory 12, the octets are demultiplexed in a demultiplexer 13 into G 2048 kbit/s channels $MUXI_0$ to $MUXI_{G-1}$, then in a demultiplexer DEMULT to give $G \times 32$ 64 kbit/s incoming channels in the individual equipments IE. A subscriber individual equipment SIE multiplexes the two respective packet mode and circuit mode channels which are delivered by the demultiplexer DEMULT, into the corresponding 128 kbit/s subscriber line SL.

All the individual equipment items IE carry out the bidirectional shaping operations, particularly transcoding between the line-code signals and the binary signals which are processed in switching network 1. The individual equipments SIE and CIE are respectively transparent to the circuit mode information transmitted from subscriber equipments SE and outside network matching interfaces ON. The individual equipments SIE, PIE, PSUIE are respectively transparent to packet mode information transmitted from subscriber equipments SE, interfaces ON and the packet switching unit PSU. Each equipment SIE, PIE, PSUIE detects the flag-presence/flag-absence transition. A flag consists of one 0 followed by six contiguous 1s and one 0, such as the octet 01111110. This transition indicates the start of a packet mode data frame coming from a subscriber equipment SE or outside networks ON. All the octets in either the circuit or packet mode are thus multiplexed and switched in switching network 1, regardless of the nature of the useful information therein.

Switching network 1 comprises, besides input multiplexer 10, output demultiplexer 13 and buffer memory (BM) 12 between the latter, and a control memory (CM) 14 equipped with writing-in and reading-out means. Switching network 1 is preferably as described in U.S. patent application Ser. No. 054,238 filed July 2, 1979. The buffer memory 12, comprising $(G \times 32)/2$ 8-bit cells, establishes bidirectional communications. Each buffer memory cell is simultaneously read and written into by addressing control memory 14. In this manner, for two 64 kbit/s channels to be switched, the word written in the cell ascribed to this switching operation in the buffer memory and coming from the first channel to be switched is read and the word delivered by the second channel is written in this cell during the time interval ascribed to the second channel. Reciprocally, during the time interval ascribed to the first channel to be switched, the word written in the buffer memory cell in question and coming from the second channel to be switched is read and the word delivered by the first channel is written in this cell.

Control memory 14 enables and receives the switching orders coming from a marking unit MU in the multiservice system via a bidirectional bus 16; the orders are at the rate of one order over $125/(G \times 32)$ µs.

In addition to conventional circuit mode channel switching, the marking unit MU performs packet mode channel switching and, in particular, the selection of a free line PSUL connected to the packet switching unit PSU in response to the detection of a flag/packet transition of an incoming line SL or PL. It will be recalled that the number of lines PSUL serving the packet switching unit is decidedly lower than the lines SL and PL taken together. With this in mind, an individual equipment SIE or PIE transmits the address of the channel or corresponding incoming line SL or PL along which a flag/packet transition has been detected; the address is transmitted to the marking unit MU via an addressing bus AB. This informs the marking unit of the start of a packet mode frame prior to reception of the first packet mode frame word in buffer memory 12, a condition that is achieved due to a delay of at least two octets in the individual equipment SIE or PIE. The marking unit MU therefore receives the channel or incoming line address. The marking unit looks through an internal storage-load memory to determine whether an outgoing line PSUL is free or not. This internal storage-load memory is an image of the buffer memory. If the reply is affirmative, the marking unit transmits the addresses of the line SL or PL and the free line PSUL to control memory 14 via bus 16 for control memory 14 to supply the address of this bidirectional switching to buffer memory 12. At the end of the exchange, with no packet discontinuity, the packet switching unit PSU transmits a so-called response frame toward the corresponding individual equipment SIE or PIE and orders the preceding lines SL and PSUL or PL and PSUL to be disconnected in the marking unit MU; the transmission from unit PSU to unit MU is via the bus DB. This disconnection is achieved by clearing the switching addresses in the buffer memory 12 and the storage-load memory in the marking unit.

The packet switching unit PSU may then, for example, retransmit the packet mode frame that it has received to a subscriber line SL or a line PL linked to the interfaces ON, by sending beforehand an order to connect a free line PSUL to a line SL or PL; the connect order is transmitted to the marking unit MU via a bus DB. This marking unit MU orders such a connection in switching network 1. In relation to the latter switching procedure and indeed to others, further details should be sought in the European patent application No. 34,514. Mention is also found therein of certain characteristics and definitions of the HDLC packet-mode transmission procedure, i.e. High Level Data Link Control procedure, between two data terminal equipment items that are, for instance, included in a subscriber equipment SE and in the packet switching unit PSU. These definitions and characteristics are set forth in detail in recommendation X.25 of the International Telegraph and Telephone Consulative Committee (C.C.I.T.T.), Volume VIII 2, Geneva, 1976.

The multiservice system as per the prior art illustrated in FIG. 1 contains a general time base TB that delivers all the timing signals necessary both for switching in network 1 and for synchronizing octets received and transmitted in the individual equipments IE. These individual equipments IE are in the immediate vicinity of the switching network 1.

Figure 2:
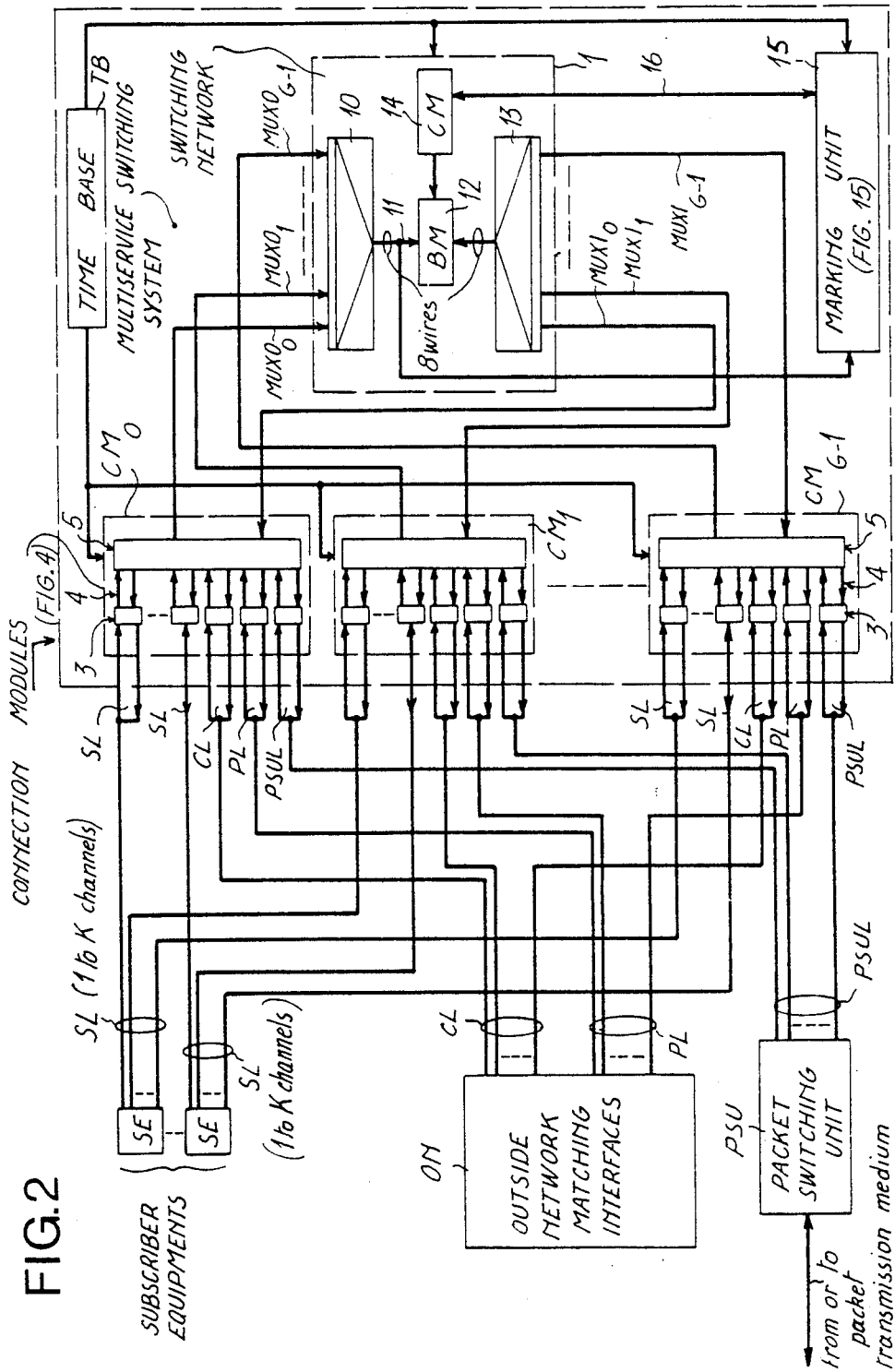
FIG. 2 is a schematic block diagram of a multiservice digital switching system in accordance with the invention.

FIG. 2 is a schematic block diagram of the multiservice switching system in accordance with the invention. Comparison with FIG. 1 shows that switching network 1 associated with a modified marking unit 15 and the various lines SL, CL, PL and PSUL have been retained. The individual equipments SIE, CIE, PIE and PSUIE as well as the multiplexer MULT and demultiplexer DEMULT have been replaced by a group of G connection modules $CM_0$ to $CM_{G-1}$, where G is a positive integer greater than 1. In FIG. 2, three modules $CM_0$, $CM_1$ and $CM_{G-1}$ are illustrated; to show the generalized situation four dashed lines subsist between modules $CM_1$ and $CM_{G-1}$ and all components and lines associated therewith.

Each connection module CM, the main improved structure of this invention, generally performs the functions of an assembly of equipments SIE, and/or PIE and/or PSUIE and a multiplexing-demultiplexing stage of the multiplexer MULT and demultiplexer DEMULT. However, contrary to the previously described prior art, the multiservice system in accordance with the invention permits differing subscriber equipments SE to be connected. These differing subscriber equipments SE are determined in terms of the number of multiplexed channels in each subscriber line SL and the modes of the respective channels thereof. A subscriber line in FIG. 2 can bidirectionally transmit an integral number, K, of 64 kbit/s channels, some in the circuit mode and the others in the packet mode. Allocation of the mode to a channel can be determined beforehand or dynamically in the subscriber equipment. In general, a connection module multiplexes a maximum of thirty one 64 kbit/s channels into a 2048 kbit/s multiplex MUXO of the switching network. The information assigned to each of these channels can stem equally well from any line SL, CL, PL, PSUL. Reference will be made hereinafter, unless otherwise stated at the end of the specification, to a connection module which serves subscriber lines SL including preferably two, resp. K channels, in the circuit mode and/or packet mode having a bit-rate of 128, resp. K×64 kbit/s, and which serves 64 kbit/s circuit mode line CL and 64 kbit/s packet mode lines PL and PSUL.

Figure 3:
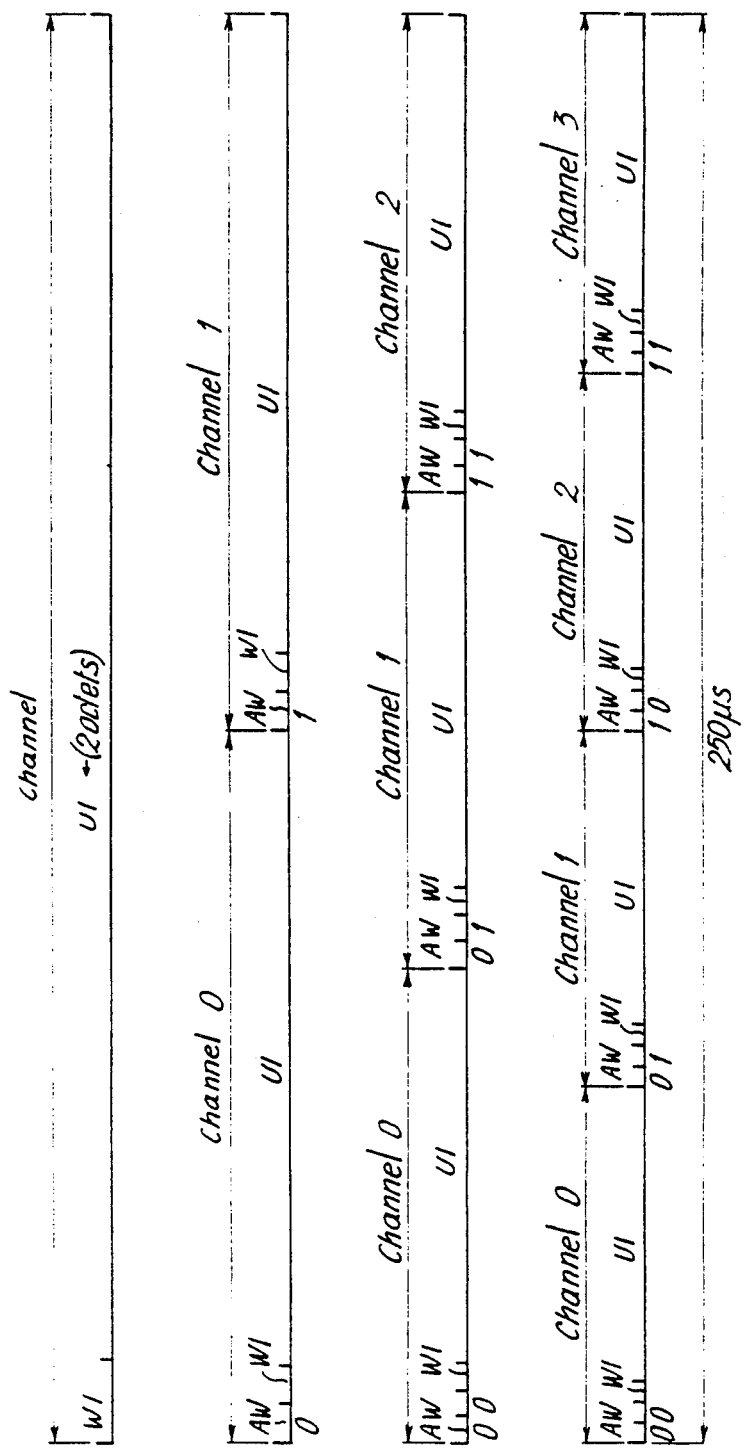
FIG. 3 includes timing charts of frames in digital lines having one or several channels and serving connection modules.

A description will not be given of any subscriber equipment that does not come within the scope of the invention. To fix ideas, it is merely assumed that a subscriber equipment SE is capable of transmitting and receiving, via the associated subscriber line, a recurrent frame that is 250 μs long and is analogous with one of those depicted in FIG. 3. The first timing chart in FIG. 3 represents a single-channel frame, preferably intended for lines CL, PL, PSUL although it could be that of a subscriber line SL. The other three timing charts in FIG. 3 represent two-, three- and four-channel frames preferably assigned to subscriber lines SL. Amongst these 2, 3 or 4 channels, preferably one at least is assigned to the circuit mode voice transmission.

In FIG. 3, the useful information (voice or packet) bit-rate of a channel is 64 kbit/s, which corresponds to sampling voice signal in octet form at a frequency of 8 kHz. In each 250 μs frame $(2/(8 \cdot 10^3))$, a channel carries a channel address word AW, generally referred to as an alignment word, a working information bit WI and 2 packetized useful information octets UI in the circuit or packet mode that are peculiar to it. Table I hereafter indicates the numbers of bits ascribed to the information and the bit-rates thereof corresponding to the charts of FIG. 3.

TABLE I

| Number of channels per frame K | Number of bits per channel | | | Number of bits per frame | | | Bit-rate in kbit/s | | | |
|---|---|---|---|---|---|---|---|---|---|---|
| | AW | WI | UI | AW | WI | UI | AW | WI | UI | Real |
| 1 | 0 | 1 | 16 | 0 | 1 | 16 | 0 | 4 | 64 | 68 |
| 2 | 1 | 1 | 16 | 2 | 2 | 32 | 8 | 8 | 128 | 144 |
| 3 | 2 | 1 | 16 | 6 | 3 | 48 | 24 | 12 | 192 | 228 |
| 4 | 2 | 1 | 16 | 8 | 4 | 64 | 32 | 16 | 256 | 304 |

In a packet mode channel, several messages can be statistically multiplexed; each of the messages has a bit-rate that is a sub-multiple of 64 kbit/s.

A detailed description is first given of a connection module CM. The modifications made to the switching network and the marking unit by this invention are set forth at a later stage.

Figure 4:
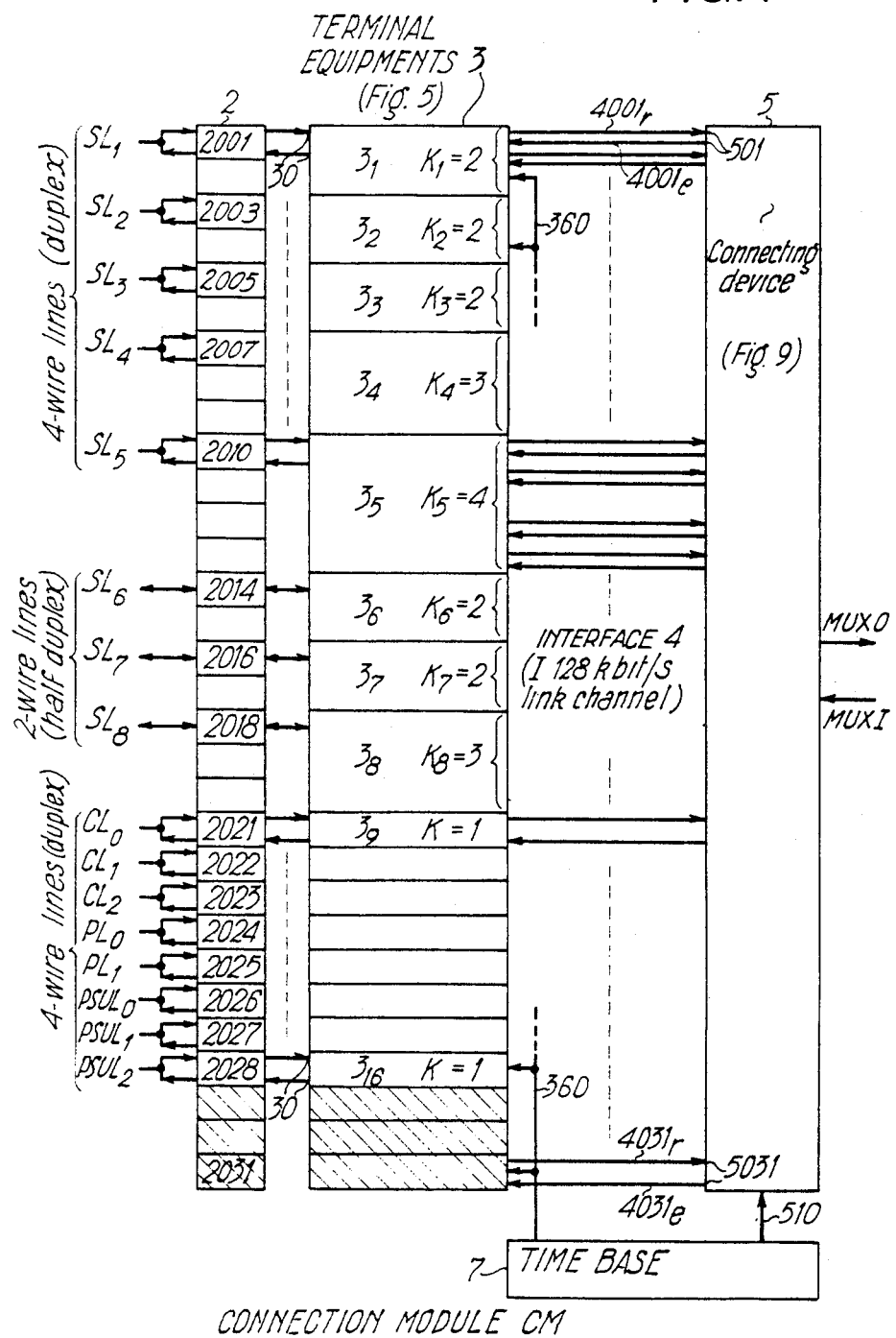
FIG. 4 is a schematic block diagram of a connection module with I link channels.

FIG. 4 is a block diagram of the overall organization of a connection module CM. It comprises, on the outside line side to the multiservice system, a connecting strip 2 which in the specific module of FIG. 4 includes 31 pairs of connecting means 2001 to 2031; for the generalized case there are I connecting means 2000. Each pair of connecting means is connected to a bifilar line in the half-duplex transmission mode; alternatively each pair of connecting means is connected to one of the pairs of wires in a four-wire line in the duplex transmission mode. The value of I=31 is chosen in terms of the number of channels I+1=32 of a frame of the outgoing and incoming multiplexed lines MUXO and MUXI of the connection module CM.

In this first embodiment, wherein the connection module CM is directly synchronized by the time base TB of the switching network 1, the first time interval $TI_0$ of the multiplexed lines MUXO and MUXI is used for transmission of the working information for the 31 multiplexed channels.

Generally speaking, at least one circuit mode line CL and at least one packet mode PL which are both linked to the outside network matching interfaces ON, and at least one packet mode line PSUL which is linked to the packet switching unit or exchange PSU, are connected to the connecting strip 2. All these lines have a useful information bit-rate equal to 64 kbit/s and are four-wire lines. The other lines connected to strip 2 are subscriber lines SL which each convey 1, 2, 3 or K multiplexed channels as in FIG. 3, where K is a positive integer. These subscriber lines SL can be half-duplex mode two-wire lines or duplex mode four-wire lines. If a line has two wires, it is coupled to one of the connecting means of a pair on strip 2.

On the other side of strip 2, each line is connected to terminals 30 of terminal equipment 3. The number of terminals 30 is equal to the number of line wires. Terminal equipment 3 adapts the electrical and transmission mode characteristics of the line to those of the outgoing and incoming multiplexed lines MUXO and MUXI of the connection module CM. Equipment 3 fulfils functions that are analogous to those of the various subscriber individual equipments SIE, FIG. 1, insofar as equipment 3 demultiplexes the useful information in the line into K channels which are transmitted toward an interface 4, and multiplexes signals transmitted in the other transmission direction from interface 4. Equipment 3 has the advantages that it distinguishes between the useful information UI and the working information WI in each of the channels, such that UI and WI may be processed separately in a connecting device 5. However, the link channels 40 of interface 4 do not have a bit-rate of 64 kbits, but rather a standardized bit-rate of 128 kbit/s; this is because the link channels originate by multiplexing useful information at 64 kbit/s and working information at 4 kbit/s of a channel in the terminal equipment 3.

As shown in FIG. 4, if the connection module includes I=31 elementary terminal locations which are assigned to monochannel lines, each piece of terminal equipment occupies a number of locations which is equal to the number of multiplexed channels in the line it serves. In other words, for each type of line, a corresponding piece of terminal equipment is chosen in terms of, on the one hand, the channel number and, on the other hand, the line transmission mode, i.e. duplex or half-duplex.

On the side of multiplexed lines MUXI and MUXO, the connection module CM includes the connecting device 5 which multiplexes the channels transmitted from all the lines. Device 5 comprises 31 terminal pairs 5001 to 5031 which are bidirectionally linked to 31 link channels 4001 to 4031 of interface 4. It can be seen that whatever the type of line is to be connected, device 5 remains unmodified and interface 4 assures the standardizing of lines, thereby enabling, in practice, all line types to be connected in terms of the terminal locations available, as subscriber requirements change.

In the illustrated embodiment in FIG. 4, eight subscriber lines $SL_1$ to $SL_8$ are connected to the connection module; three locations corresponding to connecting means 2029 to 2031 are available for connecting new lines at a later stage or for a subscriber line which is to have an increased number of channels. It has been assumed that these eight subscriber lines $SL_1$ to $SL_8$ are of the following types:

$SL_1$ to $SL_3$; four-wire lines in the duplex mode with a real bit-rate of 144 kbit/s, each having two channels, one of which is in the circuit mode and the other is in the packet mode; since each of the four-wire lines $SL_1$ to $SL_3$ has two channels the value of K for each line is two, whereby $K_1 = K_2 = K_3 = 2$;

$SL_4$; four-wire line in the duplex mode with a real bit-rate of 228 kbit/s, having three channels, one or two of which are in the circuit mode and two or one are in the packet mode, i.e. $K_4 = 3$;

$SL_5$; four-wire line in the duplex mode with a real bit-rate of 304 kbit/s, having four channels, one, two or three of which are in the circuit mode and three, two or one are in the packet mode, i.e. $K_5 = 4$;

$SL_6$ and $SL_7$; two wire lines in the half-duplex mode with a real bit-rate of $2 \times 144$ kbit/s, each having two channels, one of which is in the circuit mode and the other is in the packet mode, i.e. $K_6 = K_7 = 2$;

$SL_8$; two-wire line in the half-duplex mode with a real bit-rate of $2 \times 228$ kbit/s having one or two channels in the circuit mode and two or one channels in the packet mode.

Terminal equipments $3_1$ to $3_{16}$ in FIG. 4 serve lines $SL_1$ to $SL_8$, $CL_0$ to $CL_2$, $PL_0$, $PL_1$ and $PSUL_0$ to $PSUL_2$ respectively. Equipment $3_5$, for instance, occupies the location equivalent to four elementary terminals for a monochannel line such as CL, PL or PSUL.

It goes without saying that all the lines can be of the same type. The module CM with I link channels 4001 to 4031 may therefore serve 15 two-channel lines, or 10 three-channel lines or 7 four-channel lines.

This adaptation to subscriber requirements affords a true standardization as regards interface 4. For a predetermined number, I, of link channels, any connection combination with differing subscriber equipments which have high or low capacities and a small or large number of telephone sets and/or data terminals, is possible. The allocation of the circuit mode or the packet mode to a multiplexed channel in a subscriber line can be of a dynamic nature through an appropriate selecting unit which is controlled by the subscriber and included in his subscriber equipment SE, depending on the subscriber's needs at any given moment in time. Moreover, in conjunction with the simultaneity of at least two circuit mode and packet mode communications along a subscriber line, several data packets which are respectively ascribed to several data processing equipments can be transmitted by multiplexing the same single channel in the packet mode, where the sum of the useful information bit-rates related to these various data processing equipments cannot exceed the maximum bit-rate of 64 kbit/s.

Figure 5:
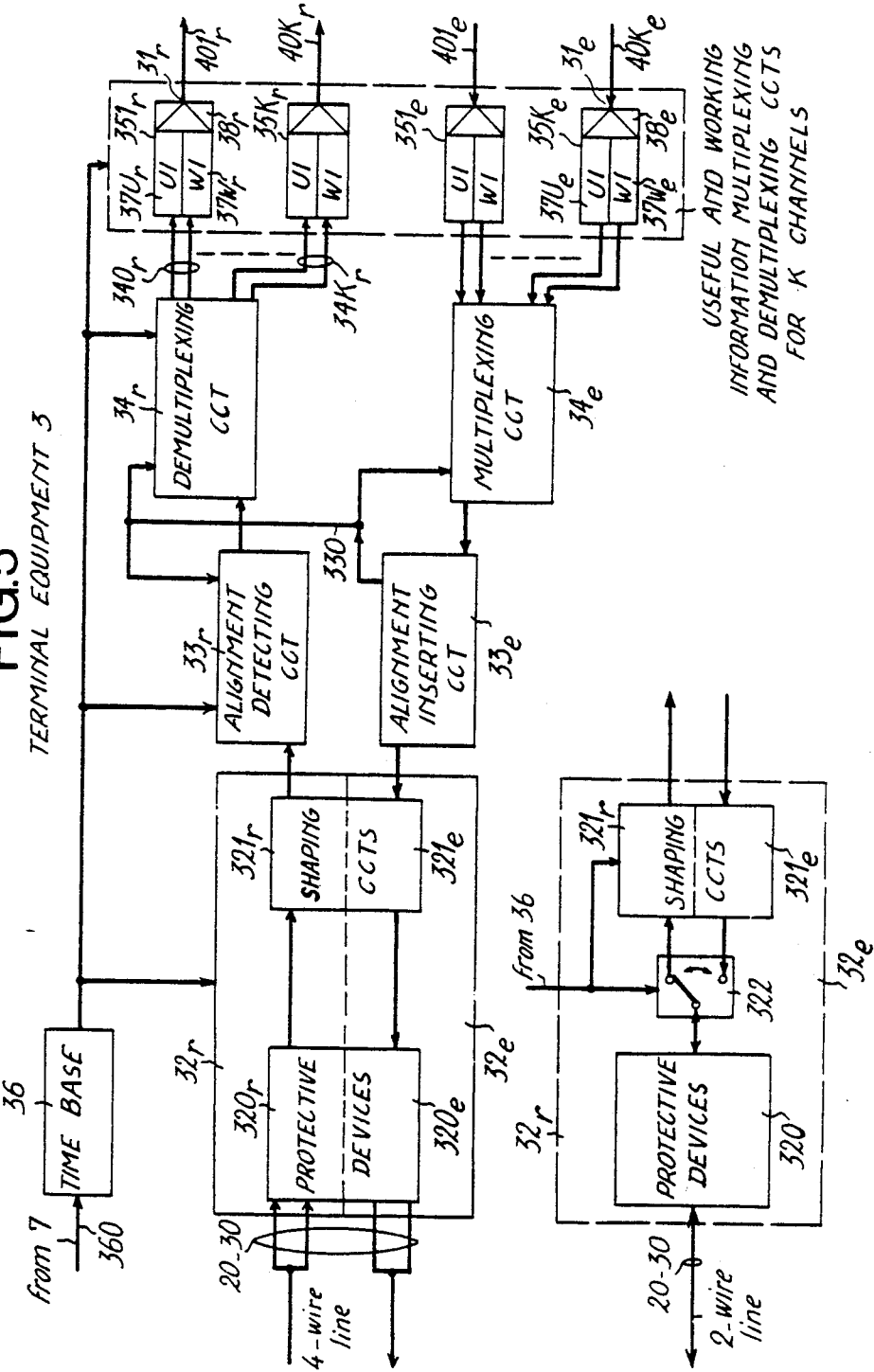
FIG. 5 is a block diagram of a terminal equipment which is included in a connection module and which is served by a duplex or semi-duplex line with K channels, termed hereinabove as second multiplexing and demultiplexing means.

With reference now to FIG. 5, a detailed description follows of a terminal equipment 3 which is connected to a digital line L having K multiplexed channels, where K is a positive integer greater than one. This line L may equally well be a subscriber line SL or a circuit mode CL and/or packet mode PL or PSUL line. Equipment 3 respectively comprises along the reception direction r—line L to interface 4—and along the opposite emission direction e—interface 4 to line L—two shaping and electrical matching circuits $32_r$ and $32_e$, an alignment detecting circuit $33_r$ and an alignment inserting circuit $33_e$, a demultiplexing circuit 34, and a multiplexing circuit $34_e$ in relation to the channels, and K demultiplexing circuits $351_r$ to $35K_r$ and K multiplexing circuits $351_e$ to $35K_e$ in relation to the useful and working information. Equipment 3 further comprises a time base 36 that receives timing signals from an overall time base 7 (FIG. 4) of the connection module via a bus 360. Time base 36 controls the above circuits by means of synchronous timing signals having notably the 64 kHz and 4 kHz frequencies and that correspond to the real binary bit-rate in the line L.

Circuits $32_r$ and $32_e$ may be of two types depending on the transmission mode when they are served by a subscriber line SL.

As illustrated by full lines in FIG. 5, when the line is a four-wire line in the duplex mode, in each of circuits $32_r$ and $32_e$, a protective device $320_r$, $320_e$ is connected via a pair of connecting means 20 of connecting strip 2 to a pair of wires of the line which corresponds to the reception, resp. emission direction, and is in series with a shaping circuit $321_r$, $321_e$. Known protective devices are used to protect the physical components in equipment 3 against accidental and indesirable overvoltages along the line L in the two transmission directions. Shaping circuits $321_r$ and $321_e$ transcode the digits in line-code, which may be a bipolar code such as the HDB3 code, into the corresponding bits to be processed in the connection module.

When the line is a subscriber two-wire line SL in the half-duplex mode, as shown in dashed lines in FIG. 5, the circuit $32_r$–$32_e$ assembly comprises only one protective device 320. This protective device is interconnected with the two wires of the line SL via a pair of connecting means 20 of the connecting strip 2, and with the common connection point of a switching circuit 322 having two channels and bit-rate expansion and compression means. The bit-rate expansion and compression operations, as is well known, enable the digital bit-rate in the terminal to be multiplied by a factor of two or more in order to provide half-duplex transmission. The other two terminal of circuits 322 are alternately connected, on the one hand, to shaping circuits $321_r$ and on the other hand, to the line L during an elementary half-duplex cycle via protective device 320. In accordance with the multiplexing characteristics depicted in FIG. 3, the elementary half-duplex cycle has a duration equal to the quotient obtained by dividing the length of a 250 μs frame by the number K of channels. During a cycle alternation of 62.5, 41.66, 31.25 μs, the eighteen or nineteen digits of a first channel having an address 0 are emitted along the line toward the associated subscriber equipment SE and during the following cycle alternation the same number of digits of channel 0 is received from the subscriber equipment, depending on whether the in-line bit-rate is $2 \times 144 = 288$, $2 \times 288 = 456$ or $2 \times 304 = 604$ kbit/s. Referring back to Table I and FIG. 3, the following elementary half-duplex cycle relates to a second channel having an address 1 and so forth until the last channel having the address K is reached. A transmission cycle for one frame with K channels lasts 250 μs.

It will be noted that, in relation to a transmission mode modification in a line with K of channels, where K does not change, the network containing circuits $32_r$ and $32_e$ can be interchangeable on the printed circuit board that constitutes terminal 2; this reduced manufacturing costs.

The input signal to alignment detecting circuit $33_r$ is derived at the output of shaping and electrical matching circuit $32_r$. Circuit $33_r$ alignment words AW are inserted in the heading of each channel time interval by the terminal of the subscriber equipment SE. The alignment words AW have a fixed configuration, which generally corresponds to the channel number or address in binary code in the 250 μs frame, as shown in FIG. 3. When emitting, alignment inserting circuit $33_e$ performs the reverse operation by inserting the alignment words at the start of the respective channel time intervals. Circuit $33_e$ comprises an alignment word generating means which, for each emission of an alignment word, delivers a signal to detection circuit $33_r$ and multiplexing and demultiplexing circuits $34_r$, $34_e$, via wire 330. This ensures synchronization of the subscriber equipment terminal which constitutes a "slave" station, in relation to terminal equipment 3 which constitutes a "master" station and ensures clearing of alignment words upon reception in multiplexing circuit $34_r$.

Figure 6:
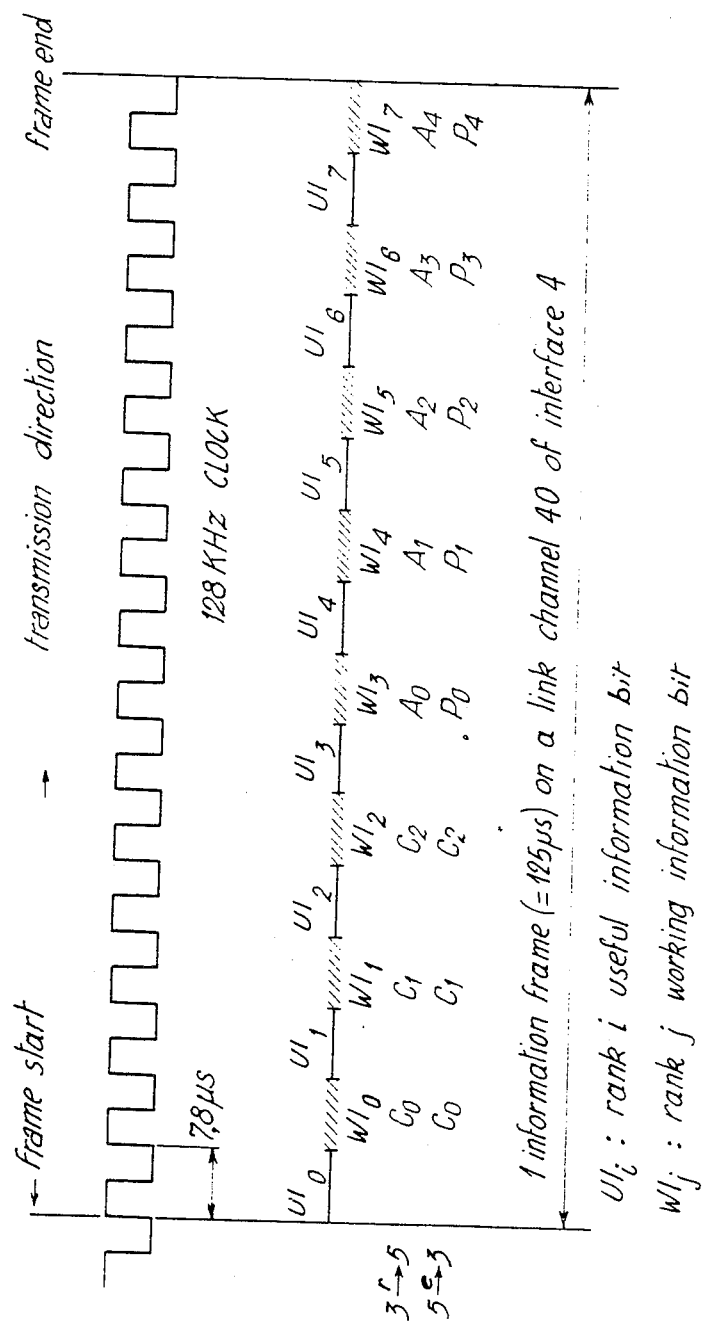
FIG. 6 is a frame timing chart for a link channel of the standardized interface in a connection module.

First demultiplexing circuit $34_r$ demultiplexes the K channels received into K pairs of channels $340_r$ to $34K_r$. Each of these channel pairs is linked to two inputs of a corresponding multiplexing circuit $351_r$ to $35K_r$. One of the channels in a pair $340_r$ to $34K_r$ conveys the useful informations UI of respective channel 1 to K with a bit-rate of 64 kbit/s whereas the other channel of the pair conveys the working informations WI of respective channel 1 to K with a bit-rate of 4 kbit/s. Each multiplexing circuit $35_r$ is made up of two buffer memories $37U_r$ and $37W_r$ which respectively store the useful informations UI and the working informations WI under the control of writing signals which have frequencies of 64 and 4 kHz and which are derived by time base 36. These two buffer memories are read alternately at a frequency of 128 kHz such that a parallel-to-serial converter $38_r$ included at output $31_r$ of circuit $35_r$ may deliver a frame that is composed of 8 useful information UI bits and 8 working information WI bits and has a length of 125 μs as depicted in FIG. 6; the UI and WI bits are double interlaced. This frame propagates along a corresponding link wire $401_r$ to $40K_r$ of interface 4 with a bit-rate of 128 kbit/s.

Demultiplexing circuits $351_e$ to $35K_e$ and multiplexing circuit $34_e$ perform operations that are the reverse of those described above. Each demultiplexing circuit $35_e$ demultiplexes the useful and working informations which are emitted by connecting device 5 along other link wires $401_e$ to $40K_e$ of the corresponding 128 kbit/s link channel by means of a serial-to-parallel converter $38_e$ and two buffer memories $37U_e$ and $37W_e$. These two buffer memories are assigned to the useful and working informations and are read at frequencies of 64 and 4 kHz. Multiplexing circuit $34_e$ multiplexes the useful and working informations of each channel, on the one hand. On the other hand, circuit $34_e$ multiplexes the K channels with a view to forming a recurrent frame, as in FIG. 3. The elementary intervals reserved for the alignment words in this frame are empty and are filled by the latter words in alignment inserting circuit $33_e$.

For a terminal equipment 3 serving a monochannel line, according to the first line in FIG. 3, the block diagram given in FIG. 5 is more straightforward. The circuit of FIG. 5 is free of alignment detecting and inserting circuits $33_r$ and $33_e$ and comprises only one pair of demultiplexing and multiplexing circuits $35_r$, $35_e$. Shaping and electrical matching circuits $32_r$ and $32_e$ are directly connected to multiplexing and demultiplexing circuits $34_r$, $34_e$. This simple case corresponds to a terminal equipment 3 which is linked to a subscriber line SL with dynamic allocation of the sole channel to the circuit mode or the packet mode or a packet mode line PL or PSUL having a real bit-rate of 68 kbit/s.

Before describing connecting device 5 which is the same in all the connection modules CM, the characteristics of the frames travelling through interface 4 and the frames travelling along a multiplex MUXO-MUXI link connected to the switching network are initially considered.

As already explained in reference to FIG. 3, a frame travelling along a link channel 40 of the interface 4 has a time length of 125 μs and includes a useful information octet having bits $UI_0$ to $UI_7$ double interlaced with bits $WI_0$ to $WI_7$ of a working information octet from the start to the end of the frame: $UI_0$, $WI_0$, $UI_1$, $WI_1$, ... $UI_7$, $WI_7$. The binary bit-rate in the two transmission directions is equal to 128 kbit/s. The frame frequency in emission or reception for all of the channels is supplied by overall time base 7 of the connection module CM that synchronizes all time bases 36 of terminal equipments 3, via bus 360 and consequently all the frames travelling via interface 4.

The last seven bits $UI_1$ to $UI_7$ of a useful information octet in the circuit mode are representative of the coded value of a speech sample. The most significant bit is the second bit $UI_1$. The first bit $UI_0$ is a sign bit. When a useful information octet relates to a packet mode channel, it contains any eight information bits as set forth in the afore-mentioned HDLC procedure. The packet mode useful information is not synchronous in frame, in the definition meaning of the term "frame" for packet mode transmission along a multiplex MUX link, but only synchronous as regards the bit-rate. The notion of frame along a 128 kbit/s link channel of interface 4 no longer exists for the useful information in the packet mode.

A working information octet is split into two first information fields.

A first field is assigned to the first three bits $WI_0$, $WI_1$ and $WI_2$ and indicates the type of equipment connected to the line SL, CL, PL or PSUL which transits the channel, and the nature of the channel, i.e. in circuit or packet mode. The bits $WI_0$ to $WI_2$ are represented hereafter and in FIG. 6 by $C_0$, $C_1$ and $C_2$ and are identical for the two transmission directions. The bits $C_0$, $C_1$ and $C_2$ are indicated in Table II below in terms of the origin and the nature of the channel for a preferred embodiment.

TABLE II

| $C_0$ | $C_1$ | $C_2$ | Type of Line | Nature of channel |
| --- | --- | --- | --- | --- |
| 0 | 0 | 0 | unconnected | |
| 0 | 0 | 1 | SL | circuit mode |
| 0 | 1 | 1 | CL | circuit mode |
| 1 | 0 | 1 | PL | packet mode |
| 1 | 1 | 0 | PSUL | packet mode |
| 1 | 1 | 1 | SL | packet mode |

An "unconnected" line corresponds in practice to a link channel 40 of interface 4 that is not linked to or disconnected from a terminal equipment 3, such as link channels 4029, 4030 and 4031 shown in FIG. 4.

The second working information field is assigned to the last five bits $WI_3$ to $WI_7$. The content of the second working information field depends on whether it comes from outside the multiservice switching system or from its switching network.

In the reception direction r—from a subscriber equipment SE, outside network matching interfaces ON or packet switching unit PSU to connecting device 5—bits $WI_3$ to $WI_7$ for each frame are related to alarms detected upstream of the multiservice network and transmitted by the corresponding organ SE, ON and PSU. The alarms indicate, for instance, faulty functioning of a data terminal equipment, based on an error rate that is higher than a predetermined value, a loss of rythm or a supply cut-off. The bits $WI_3$ to $WI_7$ in the reception direction r are indicated hereafter and in FIG. 6 by $A_0$ to $A_4$.

In the other transmission direction, referred to as the emission direction e,—from connecting device to organ SE, ON or PSU—the second working information field bits $WI_3$ to $WI_7$ are designated by $P_0$ to $P_4$. The second working information field bits indicate positioning controls such as certain indications peculiar to the switching operation in the switching network, e.g. unavailability of the called subscriber, traffic congestion, etc ..., or peculiar to communication management, e.g. bits representing charging pulses transmitted to the meter of the calling subscriber or a signal ordering meter reading; or the second working information field bits indicate the opening and closing of a subscriber line for operating or maintenance purposes, such as conventional potential measurements in the line.

Figure 7:
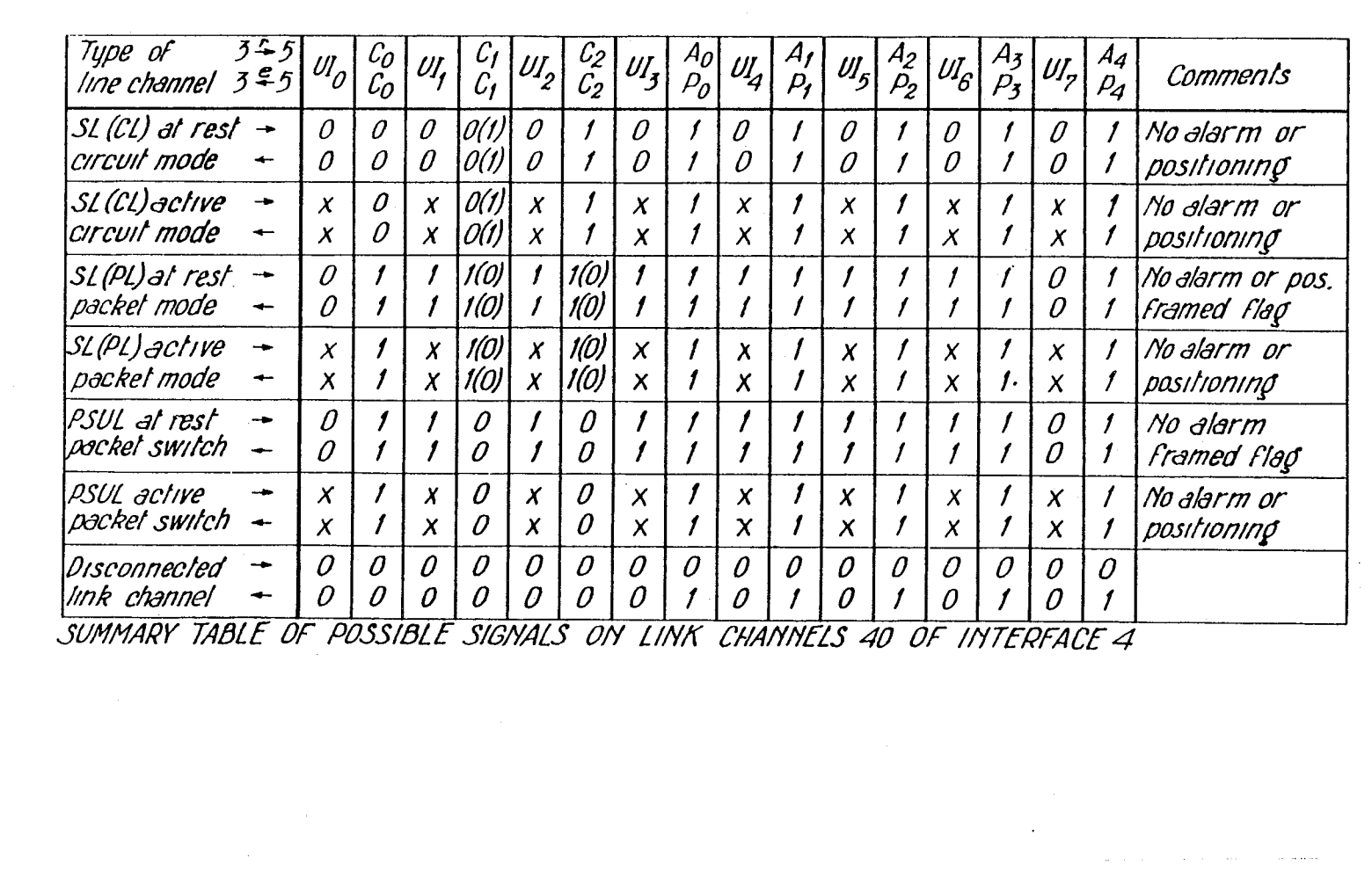

In this preferred embodiment, the higher logic level "1" in the second field of a working octet implies the absence of an alarm or positioning-request signal. The Table in FIG. 7 summarizes the various frames conveyed along a link channel 40 of interface 4.

The outgoing MUXO and incoming MUXI multiplexes of connecting device 5 have a bit-rate of 2048 kbit/s and are split into recurrent 125 μs frames, each including thirty-two time intervals $TI_0$ and $TI_{31}$. Each interval time is reserved for an octet having a 3.9 μs duration. According to the previously described embodiment in which the connection module is situated in the vicinity of the switching network and in which time base 7 of the module is directly synchronized by the time base TB of the switching network, there are I=31 time intervals $TI_1$ to $TI_{31}$ assigned to the useful information octets UI. The time intervals $TI_1$ to $TI_{31}$ in each 2048 kbit/s frame are respectively assigned to the useful information octets $UI_0$ to $UI_7$ of link channels 401 to 4031 of interface 4, both in emission and reception.

The first time interval $TI_0$ of 2048 kbit/s frames is allocated to working information octets or flag/packet transition indicating octets. The transition octet indicates the start of a data packet in a packet mode channel. The time intervals $TI_0$ are organized in a multiframe that comprises 31 frames $F_1$ to $F_{31}$ and that is $31 \times 125 \times 3875$ μs long, as depicted in FIG. 8. When no flag/packet transition is detected in a packet mode channel, (for instance frames $F_1$, $F_6$, $F_{24}$, ... FIG. 8), the interval $TI_0$ of the corresponding frame is filled with the working information octet $C_0$ to $C_2$ and $A_0$ to $A_4$ for the reception direction or $C_0$ to $C_2$ and $P_0$ to $P_4$ for the emission direction. The same can be said, but on a permanent basis, for the interval $TI_0$ of a frame related to a circuit mode or unconnected channel (frames $F_7$, $F_{23}$, $F_{30}$... FIG. 8).

When a flag/packet transition is detected in a received packet mode channel emanating from outside the system, the corresponding frame interval $TI_0$ contains a transition indicating octet (frames $F_5$ and $F_9$, FIG. 8). This is composed of two fields, as for a working information octet. The first field has three bits and contains the word 010 which indicates the flag/packet transition. The second field has five bits and contains the address of the channe; where the transition has been detected. This address can, for instance, be the binary-coded channel number 00101 for channel No. 5 and 01001 for channel No. 9 in FIG. 8. At any moment along the outgoing multiplexed signal MUXO of device 5, the working information octet of a given packet mode channel can be replaced by a transition indicating octet in response to the detection of a flag/packet transition in said channel. FIG. 9 is an illustration of the connecting device 5 of a connection module CM which couples this module to the switching network via the bidirectional 2048 kbit/s multiplexed line MUXO-MUXI. The device 5 is made up of a receiving part $5_r$ and an emitting part $5_e$. The device $5_r$ respectively multiplexes the useful and working informations of link channels $4001_r$ to $4031_r$ of interface 40 into two links $522U_r$ and $522W_r$ by means of an input multiplexing circuit $52_r$ with no distinction between the various channels. Device $5_r$ then restores the series of 31 same-rank bits into octet form $TI_0$ and $TI_1$ to $TI_{31}$ and multiplexes them into the outgoing multiplexed line MUXO by means of useful and working information memorizing circuits 53 $U_r$, 53 $W_r$, via a multiplexing OR gate 55. Emitting part $5_e$ of connection device 5 comprises circuits for performing the reverse operations of those described above. Useful and working information memorizing circuits 53 $U_e$, 53 $W_e$ serialize the same-rank bits of octets $TI_1$ to $TI_{31}$ and $TI_0$ of the incoming multiplexed line MUXI into two links 522 $U_e$ and 522 $W_e$. These two links are demultiplexed bit-by-bit into thirty-one link channels $4001_e$ to $4031_e$ of interface 40 in a demultiplexing circuit $52_e$.

Receiving and emitting parts $5_r$ and $5_e$ further comprise two special circuits 54 and 56, respectively. First circuit 54 detects the flag/packet transitions in a packet mode link channel $40_r$ in order to replace the working information octet by a flag/packet transition indicating octet. This replacement is, however, authorized only when channel mode detecting circuit 56 in the emitting part $5_e$ detects a first field $C_0$, $C_1$, $C_2$ which is included in the time interval $TI_0$ corresponding to incoming multiplexed line MUXI and which indicates the packet mode transmission in this channel. As will be seen hereinafter, this enables the mode modification of a channel in the subscriber line to be confirmed by the switching network in a subscriber equipment.

The various components of the reception and emission parts of connecting device 5 are synchronized. They receive timing signals notably at frequencies of 8 kHz for frames, 64 kHz for TI octets and 2048 kHz for bits in relation to the multiplexed lines MUXO and MUXI as well as at frequencies of 16 kHz for series of same-rank bits and 128 kHz for bits in the link channels. These timing signals are provided by a time base 51 of device 5 that is synchronized, via bus 510, by overall time base 7 for the connection module CM.

The components of receiving part $5_1$ are initialiy described.

In multiplexing circuit $52_r$ (FIG. 9) a buffer register $520_r$ is connected to the 31 parallel link channels $4001_r$ to $4031_r$ and writes the 31 same-rank bits of useful informations in a shift register 521 $U_r$ and the 31 following same-rank bits of working informations in a shift register 521 $W_r$, in parallel and alternately during a period of $2/128 = 15.6$ μs via a 31-wire bus. This separation of the information into two links 522 $U_r$ and 522 $W_r$, allows each series of 31 bits to be processed during this 15.6 μs period in memorizing circuits 53 $U_r$ and 53 $W_r$, respectively.

Figure 10:
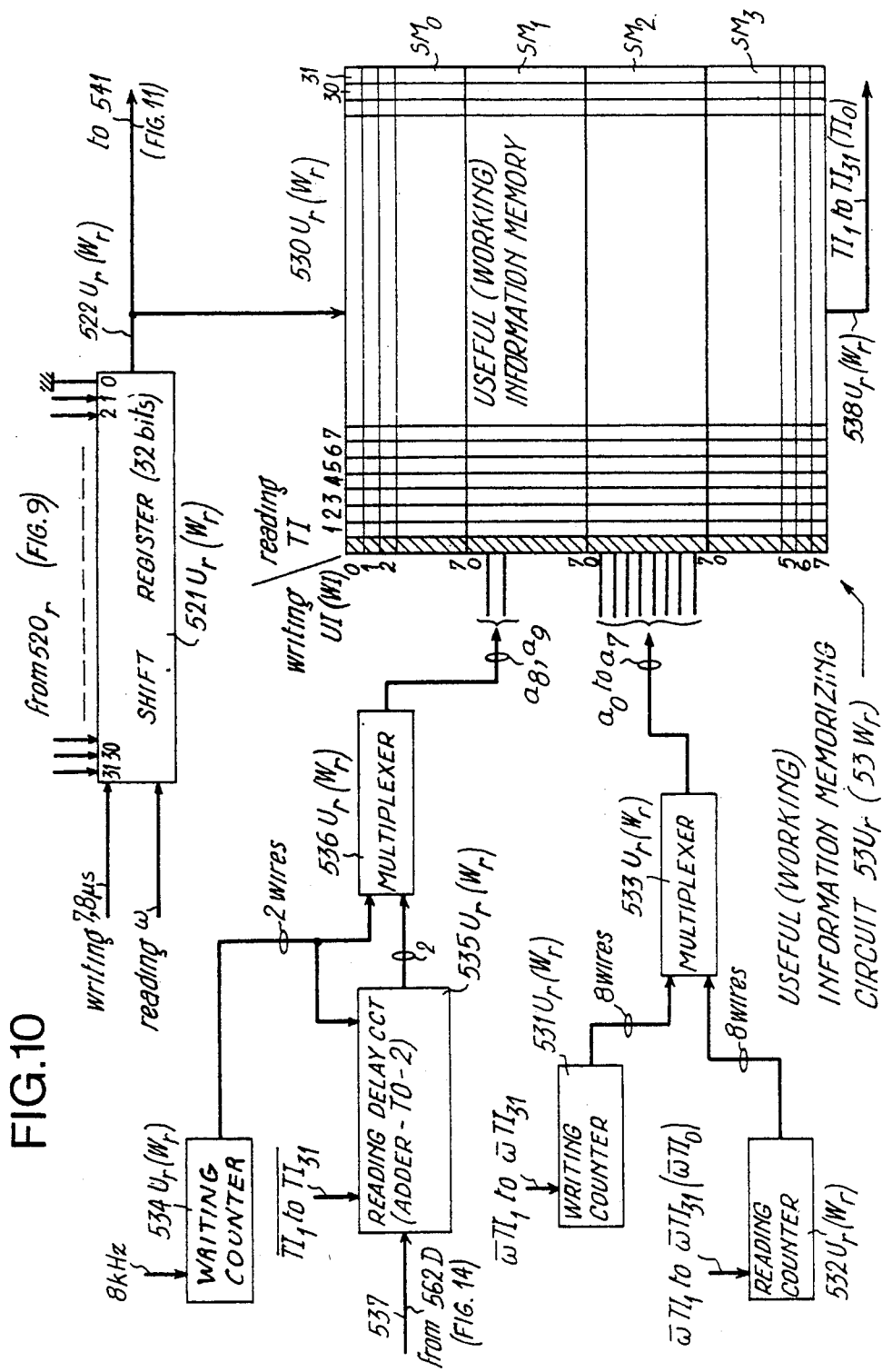
FIG. 10 is a block diagram of the useful or working information memorizing circuit in the receiving part of a connecting device.

Useful and working information memorizing circuit 53 $U_r$ and 53 $W_r$ in receiving part $5_r$, have analogous structures and have been depicted on FIG. 10. The reference letters and indications noted in brackets on the FIG. 10 relate to the working information WI memorizing circuit 53 $W_r$.

Memorizing circuits 53 $U_r$ and 53 $W_r$ are respectively organized around 1024 bit memories 530 $U_r$ and 530 $W_r$, each of which is divided into four sub-memories $SM_0$ to $SM_3$. Each sub-memory comprises a matrix of 256 1-bit cells and has 8 writing lines and 32 reading columns. The sub-memories of circuits 53 $U_r$ and 53 $W_r$ are respectively addressed by multiplexers 533 $U_r$ and 533 $W_r$, each of which multiplexes the 8-bit writing and reading addresses $a_0$ to $a_7$ which are delivered by writing counters 531 $U_r$ and 531 $W_r$ and reading counters 532 $U_r$ and 532 $W_r$. In a similar fashion, the address with two bits $a_8$, $a_9$ selects sub-memories $SM_0$ to $SM_3$ and is delivered by writing counters 534 $U_r$ and 534 $W_r$ and reading circuits 535 $U_r$ and 535 $W_r$ via multiplexers 536 $U_r$ and 536 $W_r$, respectively.

As already stated, each of 32-stage shift registers 521 $U_r$ and 521 $W_r$ has $2 \times 7.8 = 15.6$ μs for transferring its contents into memories 530 $U_r$ and 530 $W_r$ via links 522 $U_r$ and 522 $W_r$. A bit can thus be processed during an elementary time interval $\omega = 15.6$ μs$/32 = 488$ ns, which corresponds to the 2048 kbit/s binary bit-rate along the multiplexed lines MUXO, MUXI. In practice, one-half of this interval $\omega$ is used for addressing memories 530 $U_r$ and 530 $W_r$ and the other half is used for writing or reading a bit in these memories. The afore-mentioned address comprises a first part $a_0$ to $a_7$ and a second part $a_8$, $a_9$. The first address part corresponds to the cell numbers 0 to 255 in a sub-memory. The second address part corresponds to the number of the sub-memory.

Reference is firstly made to useful information memorizing circuit 53 $U_r$. The zero-rank column is not used in the memory 530 $U_r$ of this circuit 53 $U_r$. The same thing can be said of the six registers in multiplexing and demultiplexing circuits $52_r$ and $52_e$. At the start of an outgoing 2048 kbit/s multiplexed multiframe, the zero-rank bits $UI_0$ are stored in the first line of a sub-memory such as $SM_0$, and so forth until the seven-rank bits $UI_7$ have been stored in the last line of sub-memory $SM_0$. This writing operation is controlled by counter 531 $U_r$ which is incremented at each interval $\omega$ throughout time intervals $TI_1$ to $TI_{31}$. The octets are shaped by column-by-column reading, from ranks 1 to 31, as controlled by reading counter 532 $U_r$. Output 538 $U_r$ of memory 530 $U_r$ supplies the useful information octets $TI_1$ to $TI_{31}$ of a frame.

In view of the fact that a sub-memory SM cannot be read on an octet-by-octet basis along successive columns before the eight series of 31 same rank bits have been fully written, reading of bits in a sub-memory is delayed with respect to its writing operation by at least one frame length of 125 μs, and preferably twice 125 μs. Moreover, as will be seen later on, the octet reading operation for a packet mode channel must be delayed by a further 125 μs in order to detect flag/packet transitions, and even more important to allow confirmation of a mode change by the switching network in relation to a subscriber line channel. This distinction between the reading-writing delay of 250 μs for a circuit mode channel and the reading-writing delay of 375 μs for a packet mode channel, especially for a subscriber line, is indicated by a signal which is delivered to reading circuit 535 $U_r$ over a bus 537 from channel mode detecting circuit 56. Writing counter 534 $U_r$ supplies a sub-memory address $a_8$, $a_9$ at a frequency of 16 kHz whereas reading circuit 535 $U_r$ supplies a reading address of another sub-memory at the octet TI frequency of 64 kHz. Reading circuit 535 $U_r$ adds 2 or 3 modulo 4 to the address supplied by writing counter 534 $U_r$ depending on whether the signal on the bus 537 indicates a circuit mode channel or a packet mode channel. If it is assumed that information is written line by line into each one of the sub-memories in the $SM_0$, $SM_1$, $SM_2$, $SM_3$ order, the column-by-column reading operation follows the $SM_2$, $SM_3$, $SM_0$, $SM_1$ order for circuit mode octets UI and the $SM_1$, $SM_2$, $SM_3$, $SM_0$ order for packet mode octets UI.

The reading circuits 532 $U_r$ and 535 $U_r$ of working information memorizing circuit 53 $W_r$ differ from those of useful information memorizing circuit 53 $U_r$. Counter 532 $U_r$ is incremented only during the time intervals $TI_0$ of the multiframe such that output 538 $W_r$ of memory 530 $W_r$ delivers the working octets, as shown in FIG. 8. The delay between writing and reading in a sub-memory of the working information memory 530 $W_r$ is constant and equal to 250 µs and is imposed solely to inhibit any overlap between writing and reading. Reading delay circuit 535 $W_r$ is merely a straightforward 2 modulo 4 adder that is interconnected between the output of writing counter 534 $W_r$ and an input of multiplexer 536 $W_r$.

Figure 11:
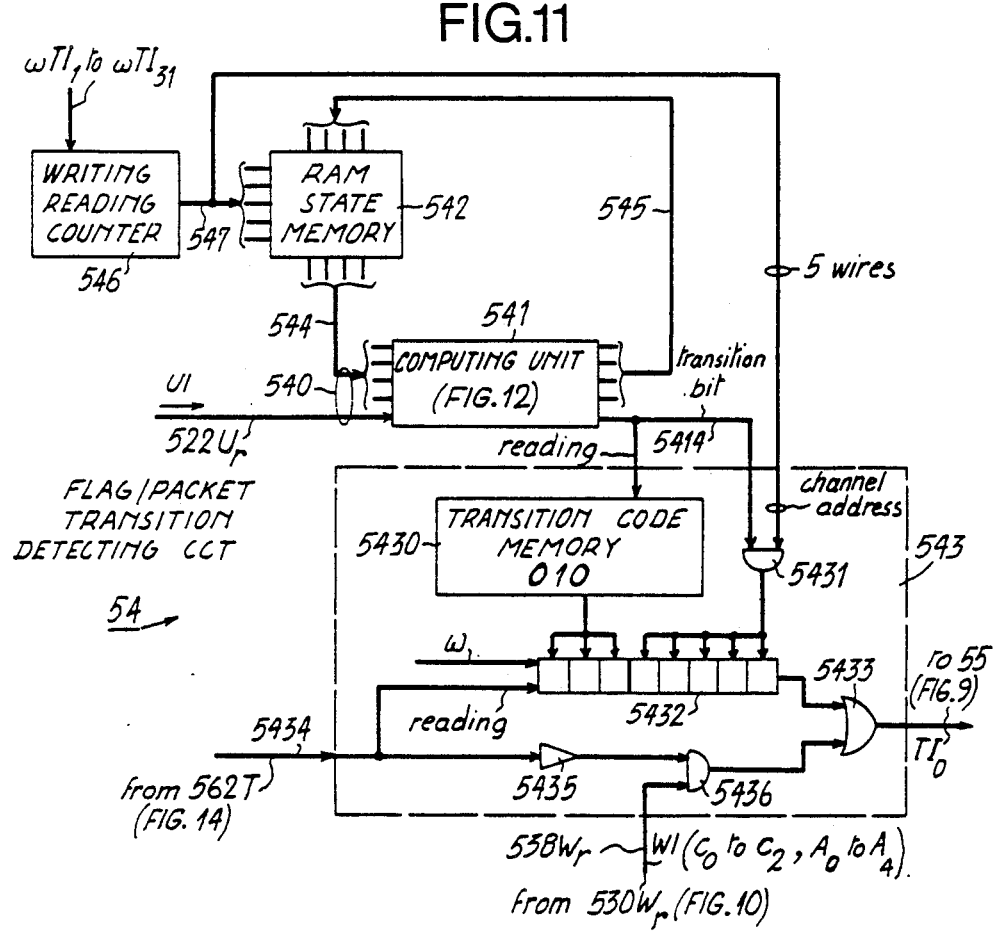
FIG. 11 is a block diagram of the flag/packet transition detecting circuit of a connecting device.

Flag/packet transition detecting circuit 54 is illustrated in FIG. 11. It is structured around a computing unit 541 that is associated with an auxiliary state memory 542 and that triggers the production of a transition indicating word in a circuit 543 in respon to the detection of a flag/packet transition.

A flag/packet transition corresponds to the opening flag which preceeds the address field of the next packet frame. Each packet frame does not contain flags so that no flag sequence need be simulated Output 522 $U_r$ of useful information register 521 $U_r$ (FIGS. 9 and 10), together with output bus 544 of state memory 542, constitute the 5-wire addressing bus 540 of a programmable memory PROM that is housed in computing unit 541. The PROM in unit 541 has 31 5-bit cells and a program that is determined in terms of the input state supplied along bus 540. The following state resulting from this program is fed by a 4-wire output bus 545 into the corresponding cell of state memory 542. This memory 542 is a memory RAM having 32 4-bit cells each of which corresponds to the state of a link channel $4001_r$ to $4031_r$. Memory 542 is read and written by a counter 546 via a channel address bus 547 at a frequency of 2048 kbit/s during a recurrent cycle of 32 ω which corresponds to a series of 31 same-rank useful information bits along link 522 $U_r$.

The program of the computing unit 541 is composed of two sub-programs. The first sub-program is intended for detection of flags between the packet frames for each link channel. The second sub-program is intended for detection of each opening flag of packet frame for each link channel.

Figure 12:
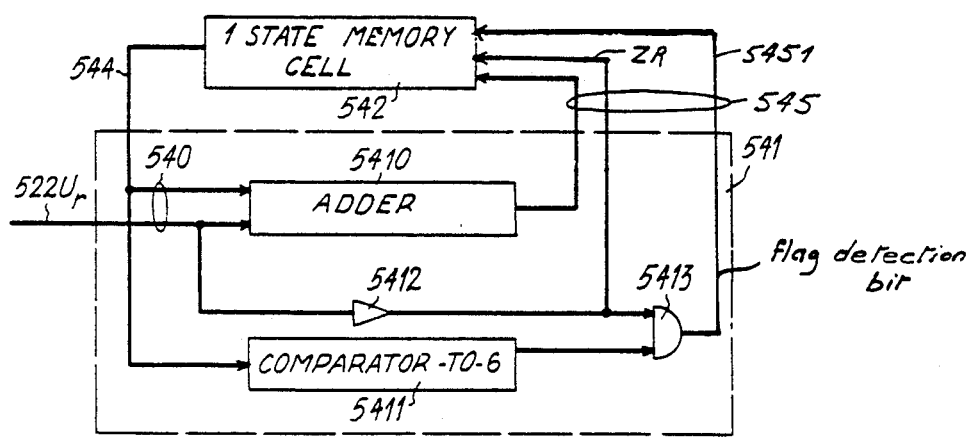
FIG. 12 is a schematic block diagram of the flag/packet transition detection process in the detecting circuit shown in FIG. 11.

Only the functions of a first network equivalent to the first sub-program and related to a link channel bit are illustrated in FIG. 12. This network essentially comprises a state adder 5410 and a comparator-to-six circuit 5411.

In FIG. 12, one state cell of the state memory 542 is related to a determined channel. Output 544 of this state cell is supplied to one of the inputs of adder 5410 and to the input of comparator 5411. The signal on link 522 $U_r$ is supplied to the other input of adder 5410 and via an inverter 5412 to (1) an input of an AND gate 5413 and (2) the zero-reset input (ZR) of storing cell 542. The other input of gate 5413 is connected to the output of comparator 5411. The outputs of adder 5410 and inverter 5412 are equivalent to wires of the outgoing state transfer bus 545 of state memory 542.

It will be recalled that the octet 01111110 is a flag. As long as the bits received from the channel in question are at the low level, cell 544 remains in the state E=0. Once a high level bit has been received at input 522, the state of the storing cell is not reset to zero and its previous state is added to unity through adder 5410; i.e., E=E+1. If the state of the considered memory cell is memory 542 is equal to E=6 simultaneously with the reception of a low level bit on line 522 $U_r$, following six consecutive "1" bits, then the comparator 5411 output opens gate 5413 which feeds a flag detection bit via wire 5451 (of the output bus 545) of computing unit 541, to the considered storing cell in state memory 542. In response to this seventh bit, a first portion of the considered storing cell in state memory 542 corresponding to the first sub-program is zero-reset via bus 545. Such a flag detection operation is performed for each of the thirty-one link channels.

A second portion of the considered storing cell in memory 542 corresponds to the second sub-program and includes a flip-flop which receives the flag detection bit via the wire 5451. This bit is read-out and applied each 125 µs to a second network (not shown) of the computing unit 541, via the bus 544, which corresponds to the second sub-program. The second network of unit 541 compares the flag detection bit with the preceding state of said flip-flop. As soon as the second network detects a predetermined state modification of said flip-flop that corresponds to the opening flag/packet frame start transition, the computing unit 541 supplies a flag/packet transition bit to output wire 5414 thereof.

Referring again to FIG. 11, a transition bit on wire 5414 controls the reading operation of a read-only-memory 5430 and the opening of five AND gates 5431 for respectively transferring in parallel the transition code word 010 and the channel address delivered by counter 546 into a shift register 5432. The content of this register includes a transition indicating word (010+channel address), such as that for channel No. 9 in FIG. 8. The serialized content of register 5432 is applied via an OR gate 5433 to an input of the output multiplexing gate 55 (FIG. 9) only when register 5432 receives a reading authorizing signal for each link channel which is delivered from the channel mode detecting circuit 56, via a wire 5434, in response to a code word $C_0$, $C_1$, $C_2$ which indicates the packet mode in Table II.

Wire 5434 is also connected, via an inverter 5435 and an AND gate 5436, to the other input of OR gate 5433. The other input of AND gate 5436 is connected to the output 538 $W_r$ of the working information memory 530 $W_r$ (FIG. 10). Consequently, until such time as a packet/flag transition has not been detected by computing unit 541, the interval $TI_0$ in the outgoing 2048 kbit/s multiframe for a given channel is occupied by a working information octet $C_0$ to $C_2$ and $A_0$ to $A_4$.

Referring again to FIG. 9, multiplexing gate 55 is connected to: (1) the output of OR gate 5433 of the transition detecting circuit (FIG. 11) which delivers the multiframe octets $TI_0$, and (2) output 538 $U_r$ of memory 530 $U_r$ of the useful information memorizing circuit (FIG. 10), which delivers the octets $TI_1$ to $TI_{31}$ of each 2048 kbit/s frame. The output MUXO of gate 55 also delivers the multiframes according to FIG. 8.

A description will now be given of transmitting or emitting part $5_e$ of connecting device 5. The prime components making up the useful and working information memorizing circuits 53 $U_e$ and 53 $W_e$ of transmitter $S_e$ and the lay-out thereof are analogous to those of memory circuits 53 $U_r$, 53 $W_r$ of the receiving part (FIG. 10). The components of circuits 53 $U_e$ and 53 $W_e$ are shown on the same FIG. 13, in which the reference letters and various indications regarding the working information memorization operation are given in brackets.

A memory circuit 53 $U_e$, 53 $W_e$ comprises a random access memory 530 $U_e$, 530 $W_e$ which has 1024 1-bit cells. An input of circuit 53 $U_e$ receives the incoming multiplexed signal MUXI, at a rate of 1 bit every $\omega = 488$ ns. This memory circuit 530 $U_e$, 530 $W_e$ also comprises four identical sub-memories $sm_0$ to $sm_3$ to preclude any writing and reading overlap in a 125 $\mu s$ frame. Each sub-memory $sm_0$ to $sm_3$ is configured as a sub-matrix that is transposed with regard to a sub-memory $SM_0$ to $SM_3$ (FIG. 10). In other words, each sub-memory $sm_0$ to $sm_3$ comprises 32 lines with 8 bits each and 8 columns with 32 bits each. In the last thirty-one lines, the useful information octets $TI_1$ to $TI_{31}$ are written for a sub-memory of the memory 530 $U_e$. During a first time interval, the first working information octet $TI_0$ is written in a sub-memory of memory 530 $W_e$. The columns are read successively so as to transmit the bits $UI_0$ of the thirty-one link channels, and then bits $UI_1 \ldots$ up to $UI_7$ of these channels, resp. the bits $WI_0$ to $WI_7$.

As for reception, circuits 53 $U_e$ and 53 $W_e$ respectively comprise writing counters 531 $U_e$ and 531 $W_e$, reading counters 532 $U_e$ and 532 $W_e$ and a writing and reading address multiplexers 533 $U_e$ and 533 $W_e$ for addressing $a_0$ to $a_7$ the cells of a sub-memory sm. Circuits 53 $U_e$ and 53 $W_e$ respectively comprise writing counters 534 $U_e$ and 534 $W_e$, reading delay circuits 535 $U_e$ and 535 $W_e$ and second writing and reading address multiplexers 536 $U_e$ and 536 $W_e$ for addressing $a_8$, $a_9$ four sub-memories $sm_0$ to $sm_4$. Delay circuits 535 $U_e$ and 535 $W_e$ introduce a constant delay which is equal to twice a frame length of 125 $\mu s$, and are analogous to a simple modulo 4 adder that adds two to the count in writing counters 534 $U_e$ and 534 $W_e$. The timing signals applied to counters 531 $U_e$ and 531 $W_e$ and 532 $U_e$ and 532 $W_e$ are analogous to those applied to corresponding counters 531 $U_r$ and 531 $W_r$ and 532 $U_r$ and 532 $W_r$ in the receiving part, except in that, in working information memorizing circuit 53 $W_e$, writing counter 531 $W_e$ controls the writing of working information $WI_0$ to $WI_7$ only during the 31 $TI_0$ of a multiframe and that reading counter 532 $W_e$ reads them during the 31 elementary intervals $TI_1$ to $TI_{31}$ of a frame.

Figure 13:
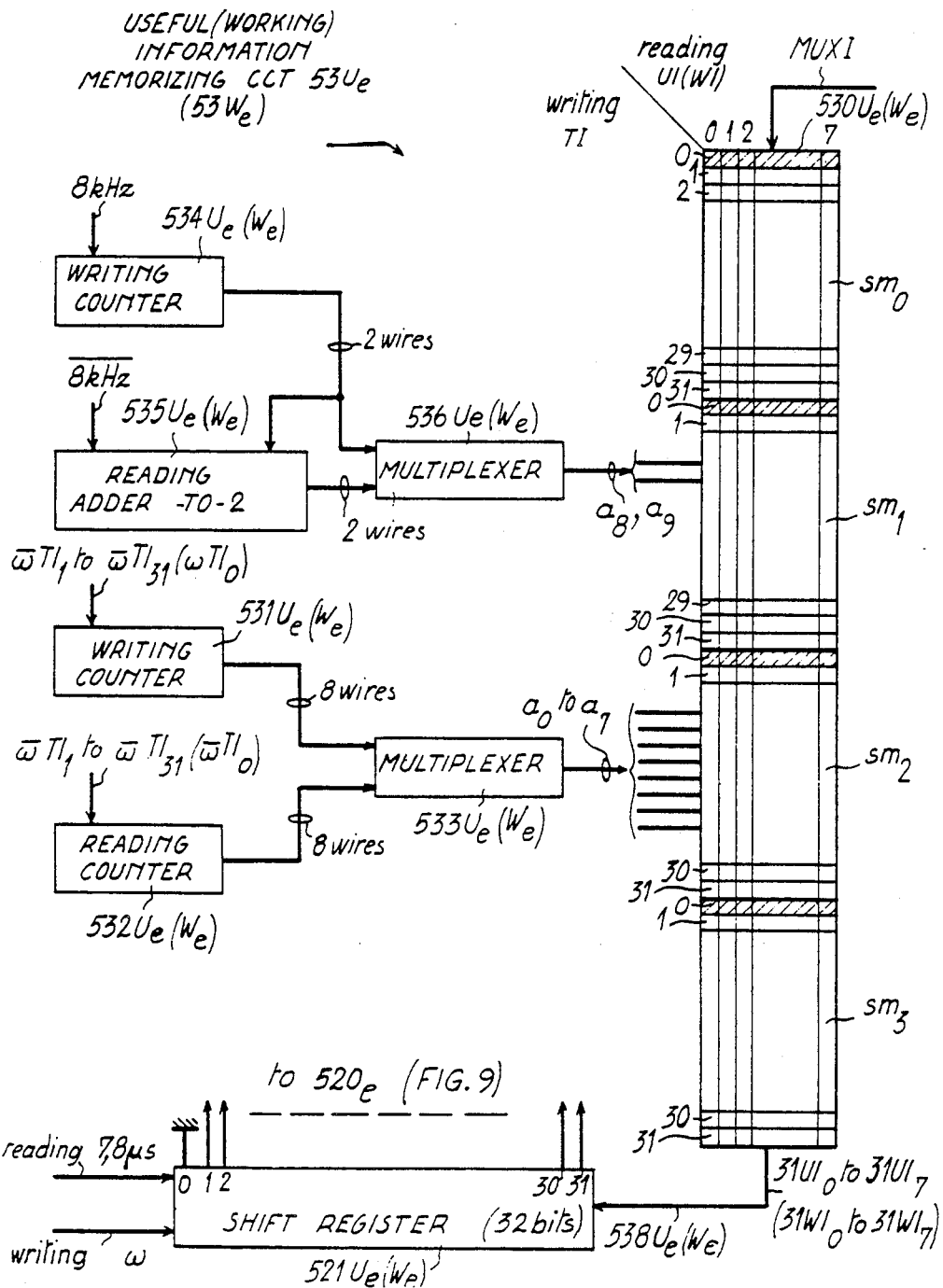
FIG. 13 is a block diagram of the useful or working information memorizing circuit in the emitting part of a connecting device.

As shown in FIGS. 9 and 13, the 31 same-rank bits of time intervals $TI_1$ to $TI_{31}$ resp. TI are delivered in series by the outputs 538 $U_e$ and 538 $W_e$ of the memories 530 $U_e$ and 530 $W_e$ toward the 32-stage shift registers 521 $U_e$ and 521 $W_e$ of the demultiplexing circuit $52_e$. The registers 521 $U_e$ and 521 $W_e$ are read alternately in parallel during a period of 15.6 $\mu s$ in order to deliver the multiplexed same-rank bits UI and WI over the 31 link channels $4001_e$ to $4031_e$ of the interface 4 via the buffer register $520_e$.

Emitting part $5_e$ is also provided with the channel mode detecting circuit 56. Its purpose is to determine the delay in reading useful information frames, which is equal to 250 $\mu s$ depending on whether the channel is in the circuit mode or packet mode, and to authorize transmission of transition indicating words (010+channel address). The 250 $\mu s$ delay obviates any overlap in writing and reading a frame in the useful and working information memories. For the useful information belonging to a packet-mode channel, besides the need to avoid this overlapping, a delay of 125 $\mu s$ must also be provided for detecting flag/packet transitions in detecting circuit 54.

Channel mode detecting circuit 56 detects the three bits $C_0$, $C_1$, $C_2$ of the code words in the intervals $TI_0$ of the incoming multiplexed MUXI multiframe and not the outgoing multiplexed MUXO frame. These conditions are required primarily by the possibility of dynamically allocating the channel modes in the subscriber equipments SE. When a subscriber equipment SE modifies the useful information mode in a channel of the line thereof, the switching network of the multiservice system must then store this new allocation and acknowledge receipt thereof by retransmitting the new code word to the subscriber equipment. Upon receipt and comparison of the new code word in the subscriber equipment, the new allocation is validated and the transitions of the packet mode channel can be detected. Channel mode detecting circuit 56 therefore selectively supplies a delay word to useful information memorizing circuit 53 $U_r$ (FIG. 10) of the receiving part and a transition authorizing word to flag/packet transition detecting circuit 54 (FIG. 11).

Channel mode detecting circuit 56, detailed in FIG. 14, comprises an input register 560 which stores the words having bits $C_0$ to $C_2$ and $P_0$ to $P_4$ included in the interval $TI_0$ and applied by the incoming multiplexed line MUXI during each 125 $\mu s$ frame. The last three stages in the register 560 contain the code word including bits $C_0$, $C_1$, $C_2$ and apply the bits in parallel to the input of a decoding circuit 561. The circuit 561 contains a code memory as in Table II. Decoding circuit 561 carries, as in the Table shown in FIG. 14, in block 561, a delay bit and a low-level transition nonauthorizing bit, or a delay bit and a high-level transition authorizing bit depending on whether the bit $C_0$ is at the "0" or "1" logic level, or generally speaking, depending on whether the mode indicating word indicates the circuit mode or packet mode. For each multiframe interval $TI_0$, the delay word and transition-authorization word are written into two respective memories 562D and 562T corresponding with the number of the respective link channel via output wires 563D and 563T of decoding circuit 561. The two memories 562D and 562T contain, for instance, 32 1-bit cells. Writing and reading in each of these memories is controlled by a conventional means that is composed of writing counters 564D and 564T, a reading counter 565D, 565T and a multiplexer 566D, 566T which delivers the writing and reading addresses onto a 5-wire addressing bus of the memory 562D, 562T.

The output of the delay word memory 562D is connected to reading delay circuit 535 $U_r$ (FIG. 10) of the useful information memorizing circuit in the receiving part via bus 537. The delay word indicates that the delay between writing and reading an octet $TI_1$ to $TI_{31}$ in memory 530 $U_r$ is equal to 250 μs (circuit mode) on 375 μs (packet mode). Reading counter 565 D as well as writing counter 564D and 564T supply addresses at a frequency of 8 kHz, equal to that of the incoming and outgoing frames.

The output of transition authorizing word memory 562T delivers an authorizing word along the wire 5434 toward transition indicating word producing circuit 543 (FIG. 11). Because the bits transmitted along link 522 $U_r$ between multiplexing circuit $52_r$ and detecting circuit 54 are serialized and multiplexed by same-rank bits, the reading counter 565T supplies a reading address every $\omega = 488$ ns and at the recurrent period of 15.6 μs for each channel, like writing counters 531 $U_r$, 531 $W_r$. As already pointed out, if the word transmitted by memory 562T indicates a packet mode channel, the word read in register 5432 (FIG. 11) is substituted for the word including bits $C_0$ to $C_2$, $A_1$ to $A_4$ when a flag/packet transition indicating bit is delivered by the computing unit 541.

Comparing FIGS. 1 and 2, it is seen that time division switching network 1 in accordance with the invention operates in an analogous fashion to that divulged in the European patent application No. 34,514 as regards switching of multiplexed lines MUXO and MUXI. One of the main differences lies in the fact that the flag/packet transition indication is no longer transmitted by a special-purpose link to the marking unit, but rather in a time interval $TI_0$ of the multiframe.

FIG. 15 is a diagram of the section of marking unit 15 according to the invention that relates to the packet mode channel switching. Depicted conventionally in FIG. 15 are a storage-load memory 150 which is an image of the buffer memory 12, and a logic control unit 151 that produces the various control signals intended for the units in switching network 1 with a view to establishing switching through control memory 14. The marking unit is conventionally structured around a microprocessor 152 that exchanges data, addresses and orders with the other components in the marking unit, via an overall bidirectional bus 153. This bus notably feeds storage-load memory 150, logic control unit 151 and the output buses of two counters 154 and 155 for a transition memory 158.

Marking unit 15 further comprises an 8-stage input register 156 and a detector 157 which detects the transition code words 010. Input register 156 is a simple buffer register that receives in parallel from supermultiplexed lines 11 in switching network 1, the octets assigned to the intervals $TI_0$ of the G multiframes which are multiplexed from the multiplexed lines $MUXO_0$ to $MUXO_{G-1}$ in the multiplexer 10. The register 156 delivers an octet $TI_0$ every $125/(G \times 32)$ μs along two output buses, one of which has three wires connected to the first three stages of register 156 and applies the code word $C_0$, $C_1$, $C_2$ to the detector 157; the other output bus of register 156 has five wires connected to the five last stages of register 156 and delivers the alarm (A) or address bits of the link channel along the five first wires of the input bus of the transition memory 158. Half of the other input bus wires of memory 158 are connected to the output of counter 155; the remaining input bus wires of 158 are connected to the output of counter 154.

Memory 158 is composed of a column of $Q \times G$ 15-bit cells, which allows Q simultaneous transitions to be stored for each multiplexed line $MUXO_0$ to $MUXO_{G-1}$. Statistically, it turns out that Q=2 flag/packet transitions is the most that can be detected simultaneous in channels related to one and the same connection module CM.

Writing a 15-bit word in memory 158 is controlled by a signal delivered by the detector 157 once it has detected the word 010. In this case, the channel address word is written via the second output bus of register 156 which detected the flag/packet transition by the associated connection module. Entered in the same line of memory 158 simultaneously with this writing operation is the address of the associated connection module 0 to $G-1$ which is applied by the counter 158, and a time-recording word which is applied by the reception hour counter 154.

For each 125 μs frame, multiprocessor 152 cyclically reads memory 158 in order to control, in a predetermined order of priority, the switching operations related to packet mode channels in which a transition has been detected. To process the information received during a 125 μs frame, the time available is just $3 \times 125$ μs in accordance with the delay imposed in the connection modules. For each non-empty line read in memory 158, microprocessor 152 interrogates storage-load memory 150 to enable this memory to transmit the identification of an outgoing channel in relation to a line PSUL that is connected to the packet switching unit PSU. This identification comprises the number of the free line PSUL and the number of the associated connection module. These numbers together with those read in memory 158 are transmitted by microprocessor 152 to logic unit 151 which then orders the bidirectional connection in question in buffer memory 12. Should no line PSUL be free, no connection is made and the subscriber equipment retransmits the discarded or lost packet once or several times until one of the data terminal equipment of the packet switching unit PSU which is connected to a free line PSUL, acknowledges receipt thereof, as per packet exchange protocol.

In another embodiment of the invention, the connection modules CM of the multiservice system are placed at remote distance from the switching network. In this case, the time base TB of the switching network is not coupled directly to the connection modules $CM_0$ to $CM_{G-1}$ and no longer synchronizes the time bases 7 of the connection modules. In this embodiment, each 2048 kbit/s frame of a multiplex MUXO, MUXI carries, as a first octet in the time interval $TI_0$, a frame alignment word such as 00001111. The operating principles of the afore-described multiservice system remain unchanged, apart from a few modifications as set forth below.

Emitting part $5_e$ of each module CM comprises, as depicted by dashed lines in FIG. 9, a frame alignment detecting circuit $57_e$ that detects the frame alignment word on the incoming multiplexed line MUXI in order to recover the timing signals in the time base TB and, consequently, to synchronize locally the time base 7 of the connection module. Reciprocally, in receiving part $5_r$, a frame alignment generator $57_r$ is controlled by the time base 7 to introduce a frame alignment word in each interval $TI_0$. The multiplex lines $MUXO_0$ to $MUXO_{G-1}$ are thus made synchronous in multiplexer 10 in a conventional manner.

According to this embodiment, the second interval $TI_1$ of a 2048 kbit/s frame is the one that is assigned to the working bits WI or words having $C_0$ to $C_2$ and $A_0$ to $A_4$ or $P_0$ to $P_4$. A connection module then feeds only 30 64 kbit/s channels $TI_2$ to $TI_{31}$. The multiframe of a 2048 kbit/s multiplexed signal comprises no more than 30 125

μs frames, as illustrated in FIG. 8 in reference to the two right hand columns.

In both embodiments, a multiframe alignment word generator and detecting circuit can be provided. A multiframe then comprises 32 resp. 31 frames (first line, FIG. 8).

In this case, for a 32-frame multiframe having a duration of $32 \times 125$ μs = 4 ms, the interval $TI_0$ of the first frame includes the multiframe alignment word, and the intervals $TI_0$ of the remaining thirty-one frames $F_1$ to $F_{31}$ include the working information bits WI assigned to the thirty-one link channels 4001 to 4031. For a 31-frame multiframe, the first two intervals $TI_0$ and $TI_1$ of the first frame $F_0$ include the multiframe alignment word and the rank-0 frame alignment word, whilst the first two intervals $TI_0$ and $TI_1$ of the remaining thirty frames $F_1$ to $F_{30}$ include the frame alignment word and the respective working information WI.

The second embodiment allows, in practice, connecting of subscriber lines and/or packet mode lines PL or PSUL to the same module CM. Furthermore, the circuit mode lines CL linking the telephone network can be connected to the switching network by means of one or several purpose-designed modules.

Certain digital, telephone or other outside networks can be envisioned as each being accessible through a special interface that is analogous to a connection module and consequently serves the multiplexer 10 and demultiplexer 13 via a multiplex bidirectional link MUXO-MUXI. Should this be so, then the connection modules CM in the system multiplex and demultiplex chiefly only those channels conveyed along subscriber lines SL.

What we claim is:

1. A time division digital switching system for switching channels with a predetermined rate, said channel having circuit mode channels and packet mode channels conveying useful information words with a predetermined number of bits, said system comprising:

G first multiplexing means, each multiplexing a group of I reception channels into an outgoing multiplexed signal, G first demultiplexing means each demultiplexing an incoming multiplexed signal into a group of I emission channels, of said multiplexed signals having a recurrent frame including I useful information words assigned to said multiplexed channels, where G and I are integers greater than one; and means for bidirectionally switching said circuit mode channels and said packet mode channels between lines carrying said incoming and outgoing multiplexed signals; each of said first multiplexing means comprising:

means for introducing working information words into predetermined time intervals, each of the information words defining a multiframe and being included in one of I consecutive frames of said outgoing multiplexed signal words, each of said information words having said predetermined number of bits respectively assigned to said I reception channels, said incoming multiplexed signals also conveying said frames and multiframes; and means for detecting flag/packet transitions in said packet mode reception channels to replace the working information word by a flag/packet transition indicating word in a frame of said outgoing multiplexed signal having the same rank in the multiframe as that in said packet mode reception channel in which a flag/packet transition has been detected;

said switching means comprising means receiving the working information words multiplexed in the multiframes of said outgoing multiplexed signals for detecting the transition indicating word to switch the channel having a detected transition over to a free packet mode channel in an incoming multiplexed signal.

2. A time division digital switching system as claimed in claim 1, wherein said transition detecting means includes means for introducing, in conjunction with said flag/packet transition indicating word, the address of said channel in which a transition is detected, in place of the corresponding working information word in said outgoing multiplexed signal, and wherein said transition indicating word detecting means includes means for reading said channel address in response to the detection of said flag/packet transition indicating word.

3. A time division digital switching system as claimed in claim 1 or 2, wherein each of said channels conveys useful information words and working information words;

wherein each of said first multiplexing means comprises means for multiplexing said I reception channels into an outgoing useful information multiplex which is applied to means for introducing useful information words into said frame of said outgoing multiplexed signal and to said flag/packet transition detecting means, and into an outgoing working information multiplexed signal which is applied to said working information word introducing means; and wherein each of said demultiplexing means comprises means for separating the useful information words within said incoming multiplexed signal into an incoming useful information multiplexed signal, means for separating the working information words within said incoming multiplexed signal into an incoming working information multiplexed signal, and means for demultiplexing said incoming useful and working information multiplexed signal into said emission channels.

4. A time division digital switching system as claimed in claim 3 wherein said working information words for each channel comprise a circuit mode or packet mode indicating word.

5. A time division digital switching system as claimed in claim 4 wherein said mode indicating word also indicates the type of device which emitted the useful information, such as a subscriber equipment, a circuit mode, or packet mode outside the switching network or a packet switching unit.

6. A time division digital switching system as claimed in claim 4 wherein each of said first demultiplexing means comprises means connected to be responsive to said incoming multiplexed signal for detecting the mode indicating word to control the replacement of said mode indicating word in a working information word relative to a corresponding reception channel in said outgoing multiplexed signal of said first multiplexed means of the same group by the flag/packet transition indicating word when a flag/packet transition in the reception channel is detected by said transition detecting means, the mode indicating detecting means being activated after said packet mode indicating word in a working information word relative to an incoming multiplex emission has been detected in said incoming multiplexed signal.

7. A time division digital switching system as claimed in claim 6 wherein, in each channel, said useful and working information words are grouped into pairs and multiplexed bit-by-bit in a frame, and wherein said outgoing and incoming useful information multiplexed signals convey in said predetermined number, a recurrent series of same-rank bits of said useful information words whilst said outgoing and incoming working information multiplexed signal convey in said predetermined number, a recurrent series of same-rank bits of said working information words.

8. A time division digital switching system as claimed in claim 7, wherein
said means for introducing useful and working information words into said outgoing multiplexed signals comprises a memory having at least two sub-memories, said incoming bit series in said predetermined number being written row by row in one of said sub memories during a frame, and said I useful information words being read column by column in another sub-memory, the information words read column by column respectively being said working information word of said reception channel having the same rank in the frame as that of said frame in said multiframe; and
said means for separating said useful and working information words in said incoming multiplexed signal including a memory having at least two sub-memories, said I useful information words being written row by row in one of said separating means sub-memories during said frame and said outgoing bit series in said predetermined number being read column by column in another separating means sub-memory, said I useful information words being respectively said working information word of said emission channel having the same rank in the frame as that of said frame in said multiframe; and
reciprocally during the following frame or a frame of predetermined rank.

9. A time division digital switching system as claimed in claim 8 wherein said mode indicating word detecting means comprises means for imposing a delay of at least one consecutive frame between writing and reading a useful information word of a packet mode channel in said memory of said useful information word introducing means after said packet mode indicating word has been detected in an incoming multiplexed emission working information word relative to the corresponding emission channel, and wherein said memory of said useful information word introducing means comprises at least three sub-memories which are cyclically written during three consecutive frames and having columns which read with a delay of at least one or two frames depending on whether the read column relates to a circuit mode channel word or a packet mode channel word.

10. A time division digital switching system as claimed in claim 1 wherein each pair of first multiplexing and demultiplexing means relating to a group of I channels is linked via second multiplexing and demultiplexing means to circuit mode and packet mode information multi-channel bidirectional digital lines, the sum of said channels of said lines being equal at the most to the integer I,
wherein in each of said line channels are successively included an address word of said channel, at least one bit of a working information word and a useful information word;
wherein said second multiplexing and demultiplexing means comprises, for each line:
at the reception end:
means for detecting said channel address words,
means for demultiplexing said useful information words and said working information bits at the respective rates thereof for each channel, and
means for multiplexing the useful information words and the working information word into a reception channel of said line in which the useful and working information words are multiplexed bit by bit;
and respectively at the emission end:
means for demultiplexing each emission channel of said line into said useful information words and said working information bits at the respective rates thereof,
means for multiplexing said useful information words and said working information bits at the respective rates thereof of all said channels into said line channels, and
means for inserting said address words in said multiplexed channels at the output of the latter multiplexing means.

11. A time division digital switching system as claimed in claim 10, wherein said second multiplexing and demultiplexing means of each line comprises means connected between the line and said channel address word detecting and inserting means for connecting and electrically matching the duplex or half-duplex transmission mode of said line.

12. A time division digital switching system as claimed in claim 11, wherein, when the line is in said half-duplex transmission mode, each elementary cycle of said half-duplex mode includes means for emitting and then receiving the information block of a single channel, the total half-duplex cycle comprising a number of said elementary cycles equal to the number of said multiplexed channels in said line.

13. A time division digital switching system as claimed in one of claim 11 or 12 wherein at least two useful information words are packetized in each channel.

14. A time division digital switching system as claimed in claim 10, 11 or 12 further including means for connecting to each first multiplexing and demultiplexing means related to at least one line, such as one half-duplex line or a duplex line, and to at least one line such as monochannel line or a line with two or more multiplexed channels.

15. A time division digital switching system as claimed in claim 10, 11 or 12 wherein each assembly of said first and second multiplexing and demultiplexing means related to a pair of incoming and outgoing multiplexed signals are contained in a module having means on the line side for a column with I locations each corresponding to second multiplexing and demultiplexing means for monochannel lines, said second multiplexing and demultiplexing means for a line with K channels occupying all or part of K adjacent locations, where K is an integer greater than one.

16. A time division digital switching system as claimed in claim 10, 11 or 12 wherein the working information and useful information rates in a line channel are in a ratio of 1/M8, where M is an integer.

17. A time division digital switching system as claimed in claim 1, wherein said first multiplexing and demultiplexing means of each group comprise means for introducing an alignment word in each frame of said outgoing multiplexed signal and means for detecting an alignment word in each frame of said incoming multiplexed signal in order to locally synchronize timing means of said first multiplexing and demultiplexing means with timing means of said switching means;

each frame of said incoming and outgoing multiplexed signals comprising an alignment word, a working information word and I useful information words.

* * * * *